(12) United States Patent
Shimomai et al.

(10) Patent No.: US 7,668,071 B2
(45) Date of Patent: Feb. 23, 2010

(54) PHASE-CHANGE OPTICAL RECORDING MEDIUM HAVING TRACKING SIGNAL SMALLER THAN SATURATION VALUE

(75) Inventors: Kenichi Shimomai, Mito (JP); Kazuo Yonehara, Hitachinaka (JP); Ikuo Matsumoto, Mito (JP); Kenji Tokui, Hitachinaka (JP); Hiroshi Tabata, Mito (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 991 days.

(21) Appl. No.: 11/044,783

(22) Filed: Jan. 27, 2005

(65) Prior Publication Data

US 2005/0265214 A1   Dec. 1, 2005

(30) Foreign Application Priority Data

Jan. 30, 2004  (JP) ............................ 2004-023446
Jan. 30, 2004  (JP) ............................ 2004-023448

(51) Int. Cl.
*G11B 7/24* (2006.01)
(52) U.S. Cl. .................................. 369/275.2
(58) Field of Classification Search .............. 369/275.2, 369/275.1, 275.4, 14, 15; 428/64.1, 64.2, 428/64.4; 430/270.13
See application file for complete search history.

(56) References Cited

U.S. PATENT DOCUMENTS 5,646,916 A * 7/1997 Kobayashi ............... 369/44.28
6,845,070 B2 * 1/2005 Seo .......................... 369/47.53

FOREIGN PATENT DOCUMENTS

| JP | 06-004900 | 1/1994 |
|----|-----------|--------|
| JP | 09-091712 | 4/1997 |
| JP | 10-255268 | 9/1998 |
| JP | 2002-304738 | 10/2002 |
| JP | 2003-162821 | 6/2003 |
| JP | 2003-228841 | 8/2003 |
| JP | 2005243213 A * | 9/2005 |

OTHER PUBLICATIONS

Japanese Office Action ((w/English Translation) (Nov. 21, 2008—4 pages).

* cited by examiner

*Primary Examiner*—Tan X Dinh
(74) *Attorney, Agent, or Firm*—Renner, Kenner, Greive, Bobak, Taylor & Weber

(57) ABSTRACT

A phase-change optical storage medium has a substrate and a recording layer having a plurality of tracks for storing information. A material of which the recording layer is made has been initialized in a crystalline state in which an amplitude of a tracking-detection signal is smaller than a saturation value of the amplitude, the tracking-detection signal being obtained by receiving a reflected beam from the recording layer when the recording layer is irradiated with a laser beam in an off-track state while the optical storage medium is being rotated.

2 Claims, 17 Drawing Sheets

| | LASER POWER [mW] | JITTER [%] | | | | | | S0/S1 | S0 [V] | S1 [V] |
|---|---|---|---|---|---|---|---|---|---|---|
| | | DOW0 | DOW1 | DOW2 | DOW9 | DOW100 | DOW1000 | | | |
| EMBODIMENT SAMPLE 1 | 2000 | 6.5 | 9.1 | 8.3 | 7.9 | 8.2 | 8.8 | 0.97 | 5.04 | 5.20 |
| EMBODIMENT SAMPLE 2 | 1800 | 6.4 | 8.6 | 8.4 | 7.8 | 7.9 | 8.0 | 0.78 | 4.06 | 5.20 |
| EMBODIMENT SAMPLE 3 | 1600 | 6.7 | 8.9 | 8.4 | 7.8 | 8.3 | 8.6 | 0.63 | 3.28 | 5.20 |
| COMPARATIVE SAMPLE 1 | 2400 | 7.2 | 14.3 | 13.0 | 10.8 | 10.5 | 11.0 | 1.00 | 5.20 | 5.20 |
| COMPARATIVE SAMPLE 2 | 1400 | | | | | | | | | |

| | LASER POWER [mW] | | | POWER RATIO | REFLECTIVITY [%] | | REFLECTIVITY RATIO | DOW-JITTER CHARACTERISTICS [%] | | | | |
|---|---|---|---|---|---|---|---|---|---|---|---|---|
| | Pw | Pe | P1 | Pe/P1 | R0 | R1 | (R1-R0)/R0 | DOW0 | DOW1 | DOW9 | DOW1000 |
| EMBODIMENT SAMPLE 4 | 17.0 | 4.6 | 6.5 | 0.7 | 19.5 | 21.1 | 0.08 | 6.5 | 8.4 | 8.1 | 8.8 |
| EMBODIMENT SAMPLE 5 | 17.5 | 6.0 | 7.5 | 0.8 | 21.0 | 21.7 | 0.03 | 6.8 | 8.8 | 7.8 | 8.0 |
| EMBODIMENT SAMPLE 6 | 16.0 | 4.2 | 6.0 | 0.7 | 16.0 | 18.4 | 0.15 | 7.4 | 8.7 | 8.2 | 8.9 |
| EMBODIMENT SAMPLE 7 | 17.0 | 3.0 | 6.5 | 0.5 | 20.0 | 21.6 | 0.08 | 7.2 | 9.2 | 8.8 | 8.8 |
| EMBODIMENT SAMPLE 8 | 17.0 | 6.5 | 6.5 | 1.0 | 20.0 | 21.6 | 0.08 | 6.4 | 8.3 | 8.5 | 9.4 |
| COMPARATIVE SAMPLE 3 | 17.0 | 4.6 | — | — | 21.6 | 22.0 | 0.02 | 7.2 | 16.6 | 8.1 | 9.6 |
| COMPARATIVE SAMPLE 4 | 15.0 | 4.2 | — | — | 19.1 | 19.4 | 0.02 | 7.5 | 13.2 | 10.5 | 11.0 |
| COMPARATIVE SAMPLE 5 | 17.0 | 4.6 | 5.0 | 0.9 | 17.5 | 21.0 | 0.20 | 9.8 | 12.8 | 9.2 | 9.8 |
| COMPARATIVE SAMPLE 6 | 17.0 | 2.5 | 6.5 | 0.4 | 19.5 | 21.1 | 0.08 | 10.0 | 20.0 | 18.0 | 18.0 |
| COMPARATIVE SAMPLE 7 | 17.0 | 7.5 | 6.5 | 1.2 | 19.5 | 21.1 | 0.08 | 7.4 | 8.9 | 9.2 | 12.0 |

$0.03 \leq (R1-R0)/R0 \leq 0.15$
$0.5 \leq Pe/Pei \leq 1.0$

FIG. 19

PHASE-CHANGE OPTICAL RECORDING MEDIUM HAVING TRACKING SIGNAL SMALLER THAN SATURATION VALUE

CROSS-REFERENCE TO RELATED APPLICATIONS

This application is based on and claims the benefit of priority from the prior Japanese Patent Application No. 2004-023446 filed on Jan. 30, 2004 and Japanese Patent Application No. 2004-023448 filed on Jan. 30, 2004, the entire contents of which are incorporated herein by reference.

BACKGROUND OF THE INVENTION

The present invention relates to an optical storage medium, an optical recording method and an optical recording apparatus, in or from such a storage medium, data being recorded, erased or reproduced with irradiation of a light beam (for example, a laser beam).

Phase-change optical storage media are data-rewritable storage media, such as, recent CD-RW, DVD-RW and DVD-RAM. Especially, DVD-RW and DVD-RAM are used for recording and rewriting a large amount of data, such as video data. Phase-change optical storage media require excellent overwrite characteristics as well as recording characteristics.

Phase-change optical storage media have a structure in which at least a dielectric layer, a recording layer, another dielectric layer and a reflective layer are laminated in order on a substrate having a bottom surface to be irradiated with a laser beam carrying a recording or reproducing power, or an erasing power. The recording layer is in an amorphous phase with low reflectivity just after formed by sputtering, for example. Thus, the phase-change optical storage media are initialized, for example, with laser irradiation when shipped, so that they come into a crystalline phase with high reflectivity.

A recording method for conventional rewritable phase-change optical storage media is as follows: In a phase-change optical storage medium having such a structure, recording pulses are applied (irradiated) onto a recording layer with a laser beam having a recording power, to melt and rapidly cool down the recording layer, thus forming amorphous recorded marks thereon. Reflectivity of the recorded marks lower than that of the crystalline-phase recording layer allows optical reading of the marks as recorded data. In erasing the recorded marks, a laser beam having a power (erasing power) smaller than the recording power is irradiated onto the recording layer to raise the temperature thereof to a temperature in the range from the crystallization temperature to the melting point to change the recording layer from the amorphous phase to the crystalline phase for erasing the recorded marks, thus overwriting being enabled.

Japanese Patent No. 2962052 proposes an initialization method that gives specific reflectivities to un-recorded and recorded sections for improvements in recording density and repeated recording characteristics. However, there is no disclosure on an initialization method for optical storage media used in high linier velocity recording. In addition, the inventors of the present invention have acknowledged that the requirements disclosed in Japanese Patent No. 2962052 only cannot offer sufficient overwrite characteristics (particularly characteristics at initial overwriting) in high-speed recording to recent media with high recording density.

Japanese Unexamined Patent Publication No. 2003-162821 proposes an optical storage medium with a specific difference between the maximum erasing rate obtained by a D.C. laser with an optimum erasing power and an erasing rate obtained with an erasing power smaller than the optimum erasing power for excellent jitter and overwrite characteristics in high linear-velocity recording. Japanese Unexamined Patent Publication No. 2003-228841 proposes a recording method and an optical storage medium with an optimum erasing power based on a relationship between an erasing power used in mark formation and change in reflectivity between marks. However, the inventors of the present invention have acknowledged that the requirements disclosed in Japanese Unexamined Patent Publication No. 2003-228841 only cannot offer sufficient overwrite characteristics (particularly characteristics at initial overwriting) in high linear-velocity recording, i.e., at DVD 4×speed (linear velocity: 14 m/s) or higher.

As discussed above, the conventional optical storage media and recording methods cannot offer sufficient overwrite characteristics in high linear-velocity recording due to problems of adversely high jitters in initial overwriting and also adverse jitter characteristics in overwriting over several hundred times.

SUMMARY OF THE INVENTION

A purpose of the present invention is to provide an optical storage medium, an optical recording method and an optical recording apparatus that offer excellent overwrite characteristics in high linear-velocity (high×speed) optical recording to rewritable phase-change optical storage media, such as, optical disks and optical cards.

The present invention provides a phase-change optical storage medium comprising: a substrate; and a recording layer having a plurality of tracks for storing information, wherein a material of which the recording layer is made has been initialized in a crystalline state in which an amplitude of a tracking-detection signal is smaller than a saturation value of the amplitude, the tracking-detection signal being obtained by receiving a reflected beam from the recording layer when the recording layer is irradiated with a laser beam in an off-track state while the optical storage medium is being rotated.

Moreover, the present invention provides a phase-change optical storage medium comprising: a substrate; and a recording layer having a plurality of tracks for storing information, reflectivity exhibited by an un-recorded section of the recording layer varying along a characteristic curve when an erasing power is gradually increased from power zero, the reflectivity being exhibited by the un-recorded section on which no information has ever-been recorded when the un-recorded section is irradiated with a reproducing light beam after irradiated with a beam having the erasing power, wherein the characteristic curve has a straight portion along which the reflectivity is almost constant, a first curve portion along which the reflectivity increases, and a second curve portion along which the reflectivity decreases, the straight portion being followed by the first and second curve portions, wherein an expression (1): $0.03 \leq ((R1-R0)/R0) \leq 0.15 \ldots (1)$ is established in which $R0$ is a reflectivity at an inflection point which is a border between the straight portion and the first curve portion, and $R1$ is a reflectivity at a peak point which is a border between the first curve portion and the second curve portion.

Moreover, the present invention provides an optical recording method of recording information to be recorded in a recording layer of a phase-change optical storage medium, wherein reflectivity exhibited by an un-recorded section of the recording layer varies along a characteristic curve when an erasing power is gradually increased from power zero, the reflectivity being exhibited by the un-recorded section on which no information has ever been recorded when the un-recorded section is irradiated with a reproducing light beam after irradiated with a beam having the erasing power, wherein the characteristic curve has a straight portion along which the reflectivity is almost constant, a first curve portion along which the reflectivity increases, and a second curve portion along which the reflectivity decreases, the straight portion being followed by the first and second curve portions, wherein an expression (1): $0.03 \leq ((R1-R0)/R0) \leq 0.15 \ldots (1)$ is established in which R0 is a reflectivity at an inflection point which is a border between the straight portion and the first curve portion, and R1 is a reflectivity at a peak point which is a border between the first curve portion and the second curve portion, the optical recording method comprises the steps of: a modulation step of modulating the information to be recorded to generate modulated data; a mark-length generation step of generating desired mark-length data based on the modulated data; and a recording step of generating a recording pulse pattern of recording pulses rising from an erasing power and formed between a recording power larger than the erasing power and a bottom power smaller than the erasing power and of erasing pulses rising from the bottom power to the erasing power, based on the mark-length data, and irradiating a recording light beam onto the recording layer in accordance with the recording pulse pattern to record at least one recorded mark representing the information to be recorded, wherein the recording step uses an erasing power Pe that satisfies an expression (2): $0.5 \leq Pe/P1 \leq 1.0 \ldots (2)$ in which Pe is the erasing power in the recording pulse pattern and P1 is an erasing power at the inflection point.

Moreover, the present invention provides an optical recording apparatus for recording information to be recorded in a recording layer of a phase-change optical storage medium, wherein reflectivity exhibited by an un-recorded section of the recording layer varies along a characteristic curve when an erasing power is gradually increased from power zero, the reflectivity being exhibited by the un-recorded section on which no information has ever been recorded when the un-recorded section is irradiated with a reproducing light beam after irradiated with a beam having the erasing power, wherein the characteristic curve has a straight portion along which the reflectivity is almost constant, a first curve portion along which the reflectivity increases, and a second curve portion along which the reflectivity decreases, the straight portion being followed by the first and second curve portions, wherein an expression (1): $0.03 \leq ((R1-R0)/R0) \leq 0.15 \ldots (1)$ is established in which R0 is a reflectivity at an inflection point which is a border between the straight portion and the first curve portion, and R1 is a reflectivity at a peak point which is a border between the first curve portion and the second curve portion, wherein the optical recording apparatus comprises: an encoder to modulate the information to be recorded to generate modulated data; a mark-length generator to generate desired mark-length data based on the modulated data; and a recorder to generate a recording pulse pattern of recording pulses rising from an erasing power and formed between a recording power larger than the erasing power and a bottom power smaller than the erasing power and of erasing pulses rising from the bottom power to the erasing power, based on the mark-length data, and irradiate a recording light beam onto the recording layer in accordance with the recording pulse pattern to record at least one recorded mark representing the information to be recorded, wherein the recorder uses an erasing power Pe that satisfies an expression (2): $0.5 \leq Pe/P1 \leq 1.0 \ldots (2)$ in which Pe is the erasing power in the recording pulse pattern and P1 is an erasing power at the inflection point.

BRIEF DESCRIPTION OF DRAWINGS

FIG. 18 is a view showing recording characteristics in embodiment samples 1 to 3 and comparative samples 1 and 2; and FIG. 19 is a view showing recording characteristics in the embodiment samples 4 to 8 and the comparative samples 3 to 7.

DETAILED DESCRIPTION OF PREFERRED EMBODIMENTS

Figure 1:
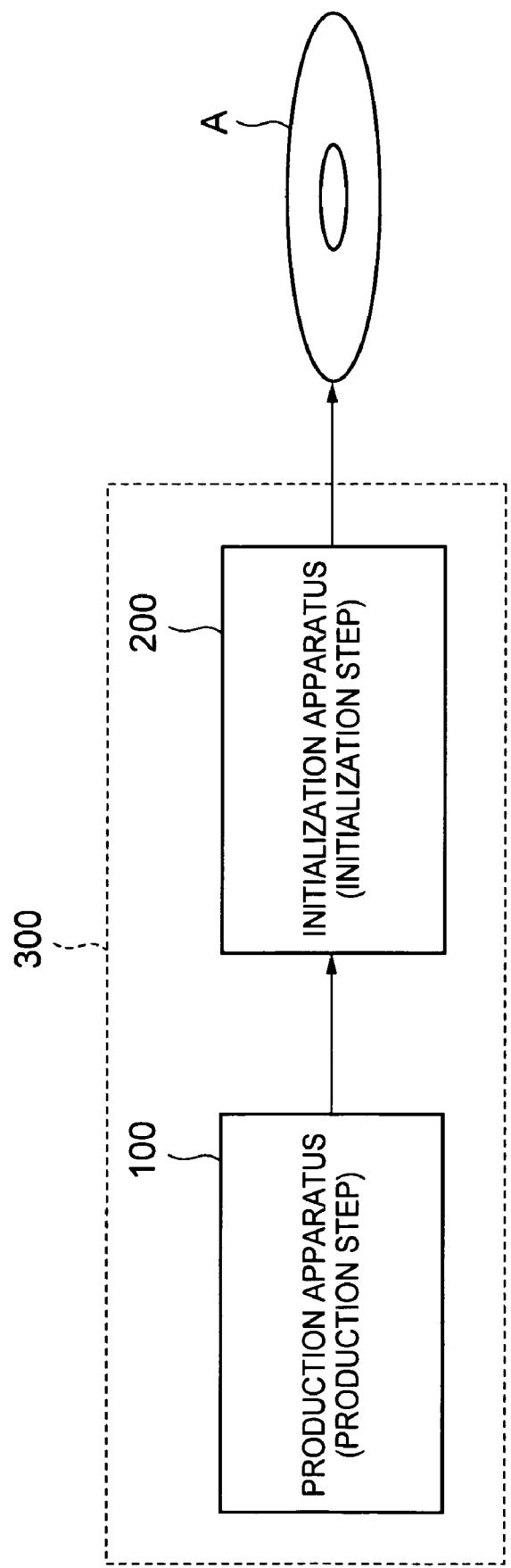
FIG. 1 is a view illustrating a production system 300 for phase-change optical storage media or production and initialization steps performed at the production system 300.

FIG. 1 is a view illustrating a production system 300 for producing phase-change optical storage media or production and initialization steps performed at the production system 300. A production apparatus (production step) 100 produces phase-change optical storage media and an initialization apparatus (initialization step) 200 initializes the phase-change optical storage media. Each phase-change optical storage medium subjected to the initialization process is shipped as an optical storage medium A.

Representative of phase-change optical storage media are phase-change optical disks such as DVD-RW, media capable of repeatedly overwriting data such as optical cards, and so on. A phase-change optical disk (an optical storage medium A) is described in the following description as an embodiment of a phase-change optical storage medium. It will, however, be appreciated that the present invention is applicable to other types of phase-change optical storage media such as optical cards.

[Structure of Optical Storage Medium]

Figure 2:
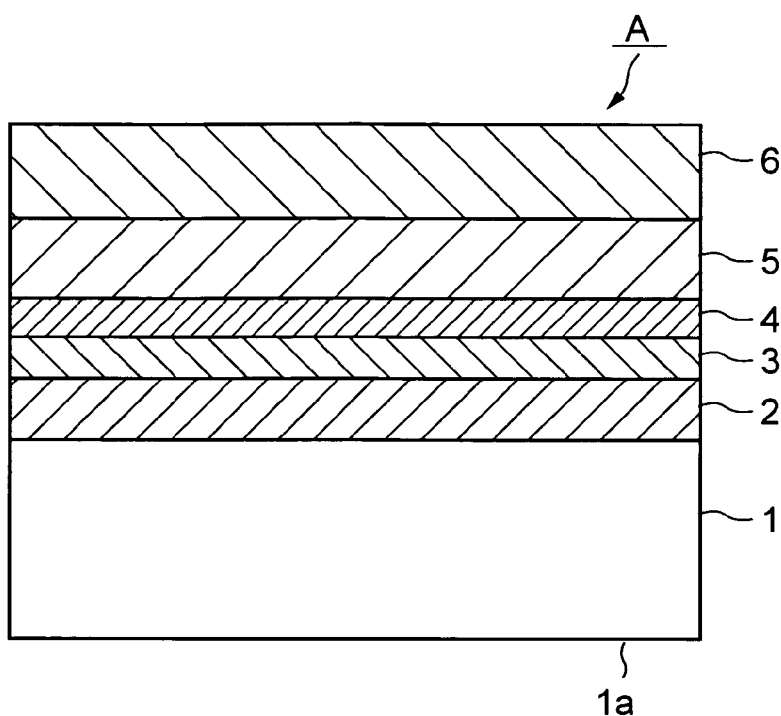
FIG. 2 is an enlarged cross section illustrating an embodiment of an optical storage medium according to the present invention.

FIG. 2 is an enlarged cross section illustrating an optical storage medium A, an embodiment of the present invention. The optical storage medium A has a structure in which a first protective layer 2, a recording layer 3, a second protective layer 4, a reflective layer 5, and a third protective layer 6 are laminated in order on a substrate 1 having a bottom surface that is an incident plane 1a on which a recording or reproducing laser beam, or an erasing laser beam is incident. The third protective layer 6 is provided according to necessity, as described later.

Suitable materials for the substrate 1 are several types of transparent synthetic resins, a transparent glass, and so on. The transparent substrate 1 is used for protection against dust, damage, etc. A focused laser beam reaches the recording layer 3 through the incident plane 1a of the substrate 1 in data recording. Suitable materials for the substrate 1 in such use are, for example, glass, polycarbonate, polymethylmethacrylate, polyolefin resin, epoxy resin, or polyimide resin. Most suitable material is polycarbonate resin for low birefringence and hygroscopicity, and also easiness to process.

Although not limited, in compatibility with DVD, the thickness of the substrate 1 is preferably in the range from 0.01 mm to 0.6 mm, particularly, 0.6 mm (for the total DVD thickness of 1.2 mm). This is because dust easily affect recording with a focused laser beam through the incident plane 1a of the substrate 1 when the thickness of the substrate 1 is less than 0.01 mm. A practical thickness for the substrate 1 is in the range from 0.01 mm to 5 mm if there is no particular requirement for the total thickness of the optical storage medium. The thickness of the substrate 1 over 5 mm causes difficulty in increase in objective-lens numerical aperture, which leads to larger laser spot size, hence resulting in difficulty in increase in storage density.

The substrate 1 may be flexible or rigid. A flexible substrate 1 is used for tape-, sheet- or card-type optical storage media whereas a rigid substrate 1 for card- or disk-type optical storage media.

The first and second protective layers 2 and 4 protect the substrate 1 and the recording layer 3 against heat which may otherwise cause inferior recording characteristics and also against optical interference which may otherwise cause low signal contrast in reproduction.

The material for each of the first and second protective layers 2 and 4 allows a laser beam to pass therethrough in recording, reproduction or erasing and exhibits a refractive index "n", preferably, in the range of $1.9 \leq n \leq 2.3$. A suitable material for each of the first and second protective layers 2 and 4 is a material that exhibits high thermal characteristics, for example, an oxide such as $SiO_2$, $SiO$, $ZnO$, $TiO_2$, $Ta_2O_5$, $Nb_2O_5$, $ZrO_2$ or $MgO$, a sulfide such as $ZnS$, $In_2S_3$ or $TaS_4$, or carbide such as $SiC$, $TaC$, $WC$ or $TiC$, or a mixture of these materials. Among them, a mixture of $ZnS$ and $SiO_2$ is the best for high recording sensitivity, C/N and erasing rate against repeated recording, reproduction or erasure.

The first and second protective layers 2 and 4 may or may not be made of the same material or composition.

The thickness of the first protective layer 2 is in the range from about 5 nm to 500 nm, preferably, 20 nm to 300 nm so that it cannot be easily peeled off from the substrate 1 or the recording layer 3 and is not prone to damage such as cracks. The thickness below 20 nm hardly offers high disk optical characteristics whereas over 300 nm causes lower productivity. A more acceptable range is from 30 nm to 80 nm.

The thickness of the second protective layer 4 is, preferably, in the range from 5 nm to 40 nm for high recording characteristics such as C/N and erasing rate, and also high stability in a number of repeated overwriting. The thickness below 5 nm hardly gives enough heat to the recording layer 3, resulting in increase in optimum recording power, whereas over 40 nm causes inferior overwrite characteristics. A more acceptable range is from 8 nm to 20 nm.

The recording layer 3 is a layer of an alloy such as Ag—In—Sb—Te or Ge—In—Sb—Te, or of Ge—In—Sb—Te added with at least any one of Ag, Si, Al, Ti, Bi and Ga. A preferable thickness range for the recording layer 3 is from 10 nm to 25 nm. The thickness below 10 nm lowers crystallization rate which causes inferior characteristics in high-speed recording whereas over 25 nm requires larger recording laser power.

An interface layer may be provided on either or each surface of the recording layer 3. One requirement for the interface layer is that it is made of a material without including a sulfide. An interface layer made of a material including a sulfide causes diffusion of the sulfide into the recording layer 3 due to repeated overwriting, which could lead to inferior recording characteristics, and also inferior erasing characteristics.

An acceptable material for the interface layer includes at least any one of a nitride, an oxide and a carbide, specifically, germanium nitride, silicon nitride, aluminum nitride, aluminum oxide, zirconium oxide, tantalum oxide, chromium oxide, silicon carbide and carbon. Oxygen, nitrogen or hydrogen may be added to the material of the interface layer. The nitride, oxide and carbide listed above may not be stoichiometric compositions for such an interface layer. In other words, nitrogen, oxygen or carbon may be excessive or insufficient, which could offer high performance, such as high durability in that the interface layer is hardly peeled off.

Preferable materials for the reflective layer 5 are a metal, such as Al, Au or Ag, an alloy of any of these metals as a major component with at least one type of metal or semiconductor, and a mixture of a metal, such as Al, Au or Ag, and a metal nitride, a metal oxide or a metal chalcogen of Al, Si, etc.

Most preferable among them is a metal, such as Al, Au or Ag, or an alloy of any of these metals as a major component, for high reflectivity and thermal conductivity. A typical alloy is made of Al and at least one of the following elements: Si, Mg, Cu, Pd, Ti, Cr, Hf, Ta, Nb, Mn, Zr, etc., or Au or Ag and at least one of the following elements: Cr, Ag, Cu, Pd, Pt, Ni, Nd, In, Ca, etc. For high linear velocity recording, the most preferable one is a metal or an alloy having Ag exhibiting extremely high thermal conductivity as a major component, in view of recording characteristics.

Any layer that touches the reflective layer 5 is preferably made of a material without sulfur when the reflective layer 5 is made of pure silver or an alloy of silver, to restrict generation of a compound of AgS.

The thickness of the reflective layer 5 is, preferably, in the range from 50 nm to 300 nm, which depends on the thermal conductivity of a material used for this layer. The reflective layer 5 of 50 nm or more in thickness is optically stable in, particularly, reflectivity. Nevertheless, a thicker reflective layer 5 affects a cooling rate. Thickness over 300 nm requires a longer production time. A material exhibiting a high thermal conductivity allows the reflective layer 5 to have a thickness in an optimum range such as mentioned above.

A diffusion prevention layer (not shown) is, preferably, provided between the second protective layer 4 and the reflective layer 5 when the layer 4 is made of a compound of ZnS and SiO$_2$ and the layer 5 is made of Ag or an alloy of Ag, to restrict decrease in reflectivity due to generation of a compound of AgS because of chemical reaction between S of the layer 4 and Ag of the layer 5.

One requirement for the material of the diffusion prevention layer is that it is made of a material without sulfur, like the interface layer described above. Specific materials for the diffusion prevention layer are the same as those for the interface layer.

[Optical Storage Medium Production Method]

Disclosed next is a method of producing an optical storage medium at the production apparatus 100.

Lamination of the first protective layer 2, the recording layer 3, the second protective layer 4, the reflective layer 5, etc., on the substrate 1 is achieved by any known vacuum thin-film forming technique, such as, vacuum deposition (with resistive heating or electron bombardment), ion plating, (D.C., A.C. or reactive) sputtering. The most feasible among the techniques is sputtering for easiness of composition and film-thickness control.

A film-forming system feasible in this method is a batch system in which a plural number of substrates 1 are simultaneously subjected to a film forming process in a vacuum chamber or a single-wafer system in which substrates 1 are processed one by one. The thickness of the first protective layer 2, the recording layer 3, the second protective layer 4, the reflective layer 5, etc., can be adjusted with control of power to be supplied and its duration in sputtering or monitoring conditions of deposited layers with a crystal oscillator.

The first protective layer 2, the recording layer 3, the second protective layer 4, the reflective layer 5, etc., can be formed while each substrate 1 is being stationary, transferred or rotating. Rotation of the substrate (and further with orbital motion) is most feasible for higher uniformity. An optional cooling process minimizes warpage of the substrate 1.

A dielectric layer of ZnS, SiO$_2$, etc., or a resin protective layer made of, for example, an ultraviolet-cured resin may be provided as the third protective layer 6 according to necessity, after the reflective layer 5, etc., are formed, to protect those layers already formed against deformation, in the extent which does not make the present invention extremely less advantageous.

Two substrates 1 having the same layers may be prepared and bonded to each other, for example by an adhesive, as a double-sided optical storage medium.

The optical storage medium A is shipped after subjected to the initialization step at the initialization apparatus 200. Initialization is a process of radiating a laser beam or light of a xenon flash lamp onto the recording layer 3 so that the layer 3 is heated and thus crystallized. Initialization with a laser beam is a better choice for less noise in reproduction.

Figure 3:
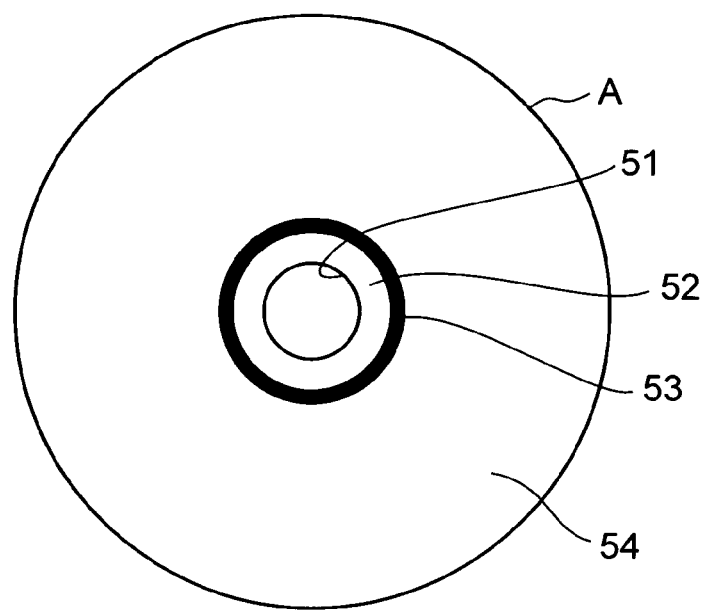
FIG. 3 is a plan view illustrating an embodiment of an optical storage medium according to the present invention.

FIG. 3 is a plan view illustrating the optical storage medium A. The optical storage medium A has a center hole 51 and a clamp area 52 thereabout. Provided concentrically around the clamp area 52 is a data area (read-in area) 53 provided around which is a recording area 54 that stores actual data such as video data and audio data. The read-in area 53 may be in a condition like ROM (Read Only Memory) or RAM (Random Access Memory). Alternatively, a high-frequency wobble or bits can be formed in a laser guide groove for gaining a tracking signal, as read-only recorded data.

[Recording Method to Optical Storage Medium]

Figure 4:
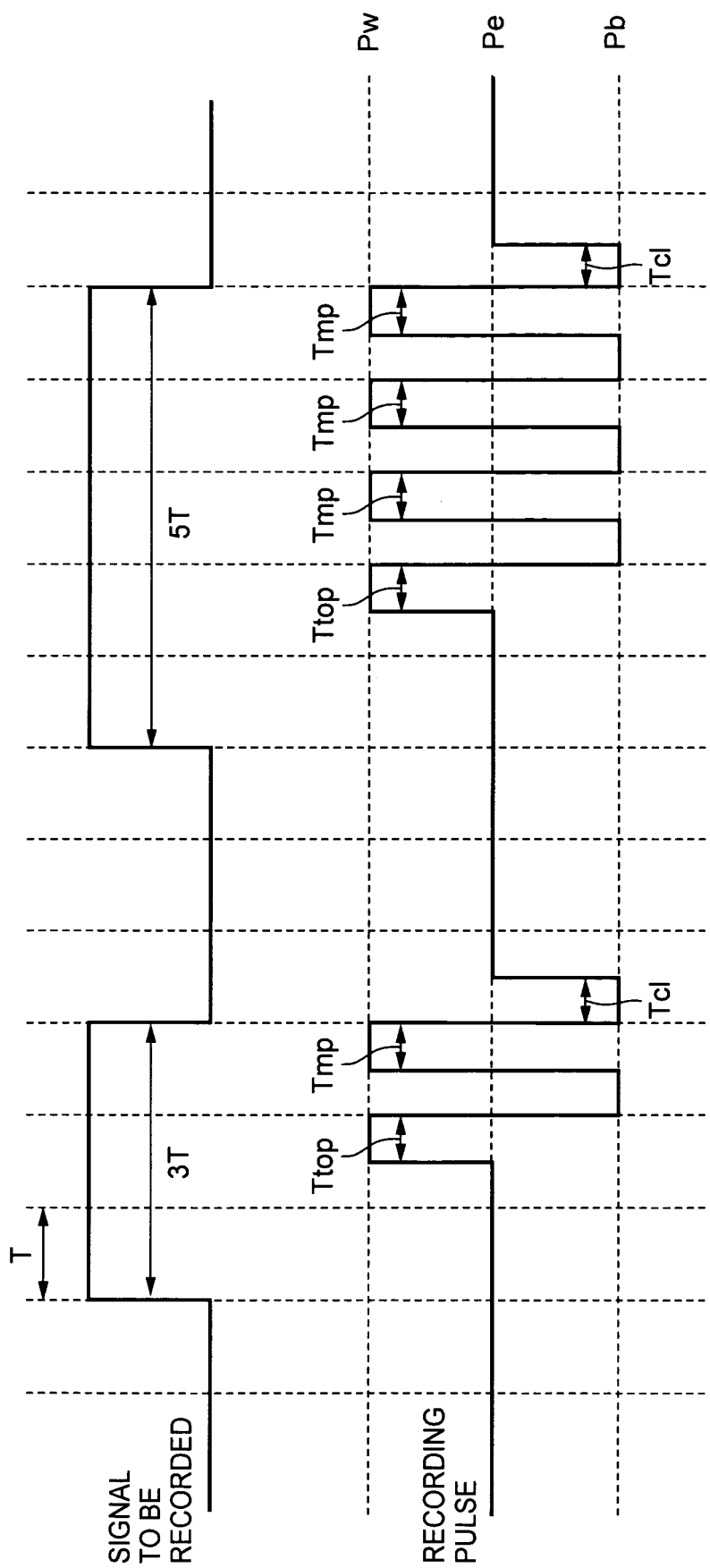
FIG. 4 is a view illustrating a first example of a recording pulse pattern.

FIG. 4 illustrates a recording pulse pattern to be used in recording data on the optical storage medium A. A laser beam is modulated with laser strength at three levels (a recording power Pw, an erasing power Pe and a bottom power Pb) based on the recording pulse pattern, with increase or decrease in the number of pulses in accordance with a mark length carried by a signal to be recorded, to form recorded marks having a given mark length on the recording layer 3. In terms of laser strength, the recording power Pw is the largest, the erasing power Pe the smaller, and the bottom power Pb the smallest.

As illustrated in FIG. 4, the recording pulse pattern consists of a top pulse Ttop that rises from the erasing power Pe for initially applying a laser beam onto the recording layer 3 with the recording power Pw, multipulses Tmp, that follows the top pulse Ttop, for alternatively applying the recording power Pw and the bottom power Pb, and an erasing pulse Tcl, located at the end of the pattern, that rises from the bottom power Pb in application of a laser beam with the erasing power Pe. The top pulse Ttop and the multipulses Tmp constitute a recording pulse for recording a recorded mark on the recording layer 3. A recording pulse may be formed only with the top pulse Ttop with no multipulses Tmp.

For example, in DVD-RW, there are ten types of mark length, that is, 3T, 4T, 5T, 6T, 7T, 8T, 9T, 10T, 11T, and 14T. In general, the number of the multipulses Tmp is (n−1) or (n−2) when a mark length is expressed as nT. FIG. 4 indicates (n−2) for the multipulses. Here, T indicates a unit clock, 1T=38.2 ns at DVD×1 speed (recording linear velocity: 3.5 m/s), 1T=9.6 ns at DVD×4 speed (recording linear velocity: 14.0 m/s) for DVD-RW.

Figure 5:
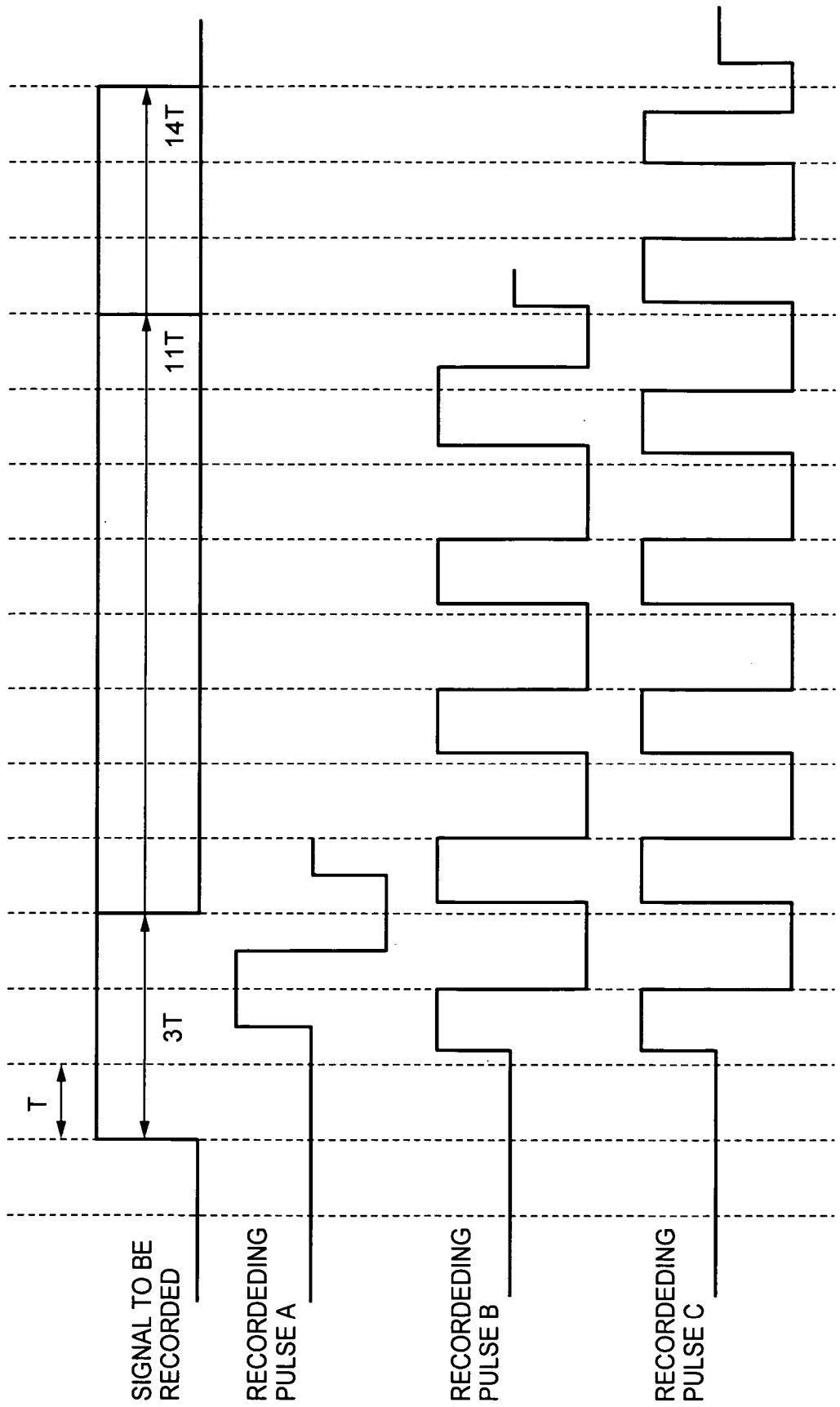
FIG. 5 is a view illustrating a second example of a recording pulse pattern.

A 2T-based recording pulse pattern such as shown in FIG. 5 is applicable to recent high-speed recording with a short unit clock in the order of several nanoseconds, in view of the limit of response of laser pulses in raising and falling. In FIG. 5, recording pulses A, B and C have recording pulse patterns for recording recorded marks having mark lengths of 3T, 11T and 14T, respectively.

[Optical Recording Apparatus]

Figure 6:
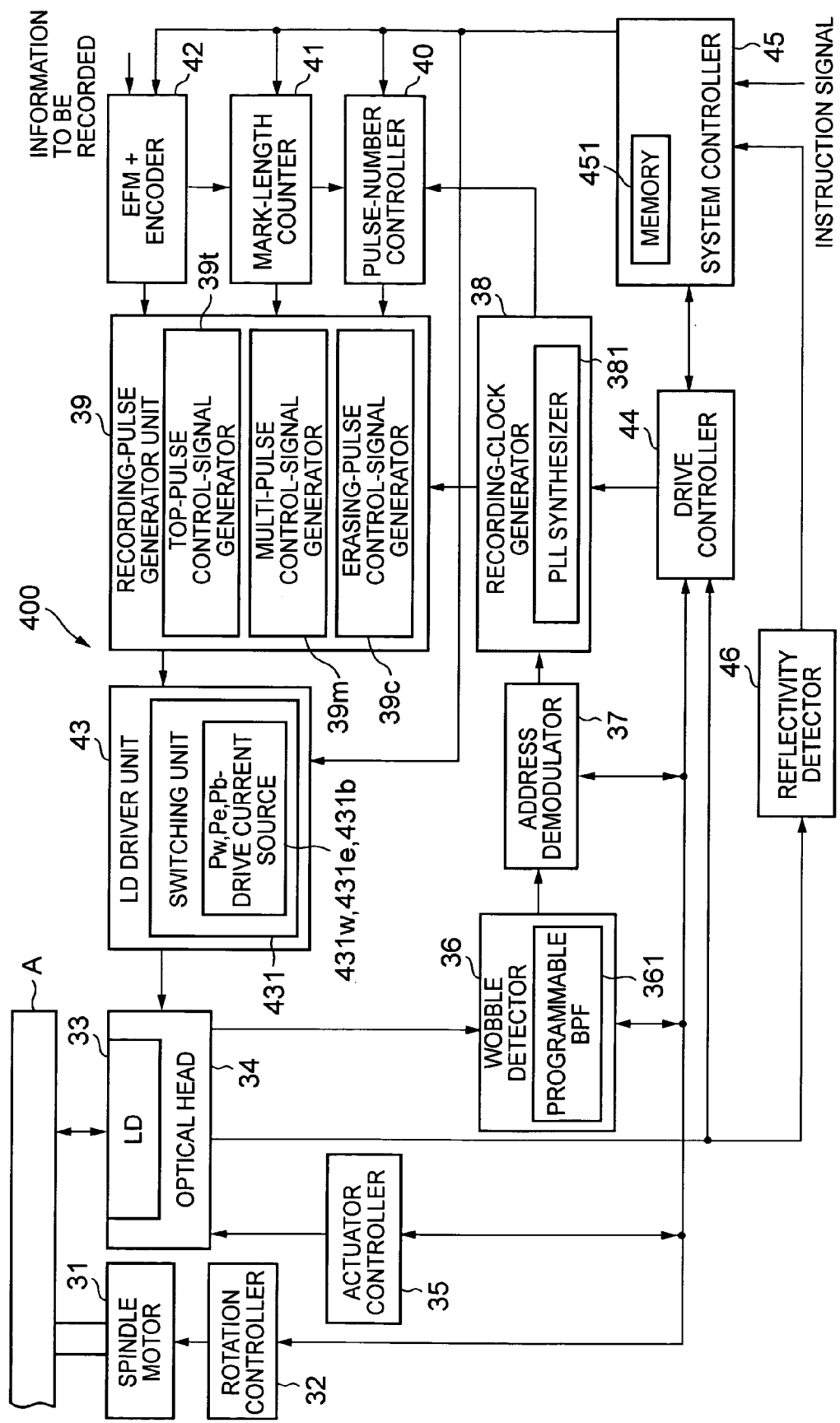
FIG. 6 is a block diagram of an embodiment of an optical recording apparatus according to the present invention.

FIG. 6 shows an embodiment of an optical recording apparatus according to the present invention, for irradiating a laser beam having a given recording pulse pattern onto the optical storage medium A.

The optical storage medium A is rotated by a spindle motor 31. The spindle motor 31 is controlled by a rotation controller 32 so that its rotating speed reaches a recording linear velocity corresponding to a target recording speed. Provided as movable in the radius direction of the optical storage medium A is an optical head 34 equipped with a semiconductor laser (LD) 33 for use in recording, reproduction or erasing to the optical storage medium A, an objective lens (not shown) for focusing an irradiated laser beam of the LD 33, and a quadrant (for example) photo-detector 341 (shown in FIG. 7).

A recommendable light source for recording in the optical recording apparatus of this embodiment is a high-intensity light source of a laser beam or strobe light, for example. Most recommendable is a semiconductor laser for compactness, low power consumption and easiness in modulation.

The quadrant photo-detector 341 of the optical head 34 receives a reflected light beam of a laser beam irradiated onto the optical storage medium A from the LD 33. The quadrant photo-detector generates a push-pull signal based on the received light and outputs it to a wobble detector 36. It also outputs a focus error signal and a tracking error signal to a drive controller 44 based on the received light beam. A reproduced signal that is a composite signal of the quadrant photo-detector is output to a reflectivity detector 46.

The drive controller 44 controls an actuator controller 35 based on the supplied focus and tracking error signals. The actuator controller 35 controls the optical head 34 in focusing and tracking to the optical storage medium A. The reflectivity detector 46 detects a reflectivity based on the supplied signal thus reproduced and outputs a detected result to a system controller 45.

The wobble detector 36, equipped with a programmable band-pass filter (BPF) 361, outputs a detected wobble signal to an address demodulator 37. The address demodulator 37 demodulates and outputs an address from the detected wobble signal. The demodulated address is input to a recording-clock generator 38, equipped with a PLL synthesizer 381, which generates a recording-channel clock and outputs it to a recording-pulse generator unit 39 and a pulse-number controller 40.

The recording-clock generator 38 is controlled by the drive controller 44. Also controlled by the drive controller 44 are the rotation controller 32, the actuator controller 35, the wobble detector 36, the address demodulator 37, and the system controller 45.

The drive controller 44 outputs the wobble signal supplied from the wobble detector 36 to the recording-clock generator 38, and also the address data supplied from the address demodulator 37 to the system controller 45.

The system controller 45, having the memory 451, controls an EFM+encoder 42, a mark-length counter 41, the pulse-number controller 40, and an LD driver unit 43. The EFM+ encoder 42 modulates input information to be recorded into modulated data with 8-16 modulation and outputs it to the recording-pulse generator unit 39 and the mark-length counter 41. The mark-length counter 41 works as a mark-length generator that counts intervals of inversion of the modulated data to generate mark-length data, the counted value being output to the recording-pulse generator unit 39 and the pulse-number controller 40. The pulse-number controller 40 controls the recording-pulse generator unit 39 to generate specific recording pulses based on the supplied counted value and recording-channel clock.

The recording-pulse generator unit 39 is equipped with a top-pulse control-signal generator 39$t$, a multipulse control-signal generator 39$m$, and an erasing-pulse control-signal generator 39$c$. The top-pulse control-signal generator 39$t$, the multipulse control-signal generator 39$m$, and the erasing-pulse control-signal generator 39$c$ generate a top-pulse control signal, a multipulse control signal, and an erasing-pulse control signal, respectively. Each control signal is supplied to the LD driver unit 43. A switching unit 431 switches a drive current source 431$w$ for recording power Pw, the drive current source 431$e$ for erasing power Pe, and a drive current source 431$b$ for bottom power Pb based on the supplied control signals, thus generating a recording pulse pattern.

The Pw-drive current source 431$w$, the Pe-drive current source 431$e$, and the Pb-drive current source 431$b$ supply currents to the optical head 34 based on a recording powers Pw, an erasing powers Pe and a bottom power Pb prestored in the memory 451 of the system controller 45. These three values are optimum values for offering the optical storage medium A excellent recording characteristics. Identification data that indicates these three values may be prestored in the memory 451, updated or stored with the help of the reflectivity detector 46. The memory 451 is either a ROM (Read Only Memory) or a recordable RAM (Random Access Memory), for example.

The optical recording apparatus in this embodiment can set any recording linear velocity selected among a plurality of recording linear velocities for higher linear velocity (×speed) in optical storage media. On receiving an instruction signal for selecting a recording linear velocity (×speed mode), the system controller 45 controls the Pw-drive current source 431$w$, the Pe-drive current source 431$e$, and the Pb-drive current source 431$b$, as disclosed above, based on the identification data on an instructed recording linear velocity and prestored in the memory 451. Identification data at a plurality of recording linear velocities are prestored in the memory 451, as disclosed above.

A generated recording pulse pattern is input to the optical head 34. The optical head 34 controls the LD 33 to output LD-emission waveforms with a desired recording pulse pattern and power ratio $\epsilon$ (Pw/Pe), thus recording information to be recorded on the optical storage medium A.

The recording-pulse generator unit 39, the LD driver unit 43, and the optical head 34 work together as a recording unit 400 that generates a recording pulse pattern of recording pulses rising from an erasing power Pe and formed between a recording power Pw larger than the erasing power Pe and a bottom power Pb smaller than the erasing power Pe and of erasing pulses rising from the bottom power Pb to the erasing power Pe, based on the mark-length data generated by the mark-length counter 41, and irradiates a recording beam onto the recording layer 3 of the optical storage medium A through the LD 33 in accordance with the recording pulse pattern, thus recording recorded marks indicating the information to be recorded.

[Study of Initialization Power]

The inventors of the present invention presupposed that a power (initialization power) of an initialization laser in initialization of an optical storage medium A at the initialization apparatus 200 could affect recording and overwrite characteristics of the optical storage medium A, and found out that the presumption is correct and determined a specific initialization power that gives excellent recording and overwrite characteristics, based on the following embodiment samples 1 to 3 and comparative samples 1 and 2.

An initialized state of the optical storage medium A in each of the embodiment and comparative samples was observed in amplitude of a differential signal (tracking detection signal) in an off-track state. Here, the off-track state is a state in which a spot of a reproducing laser beam emitted on the optical storage medium A cannot follow tracks.

Figure 7:
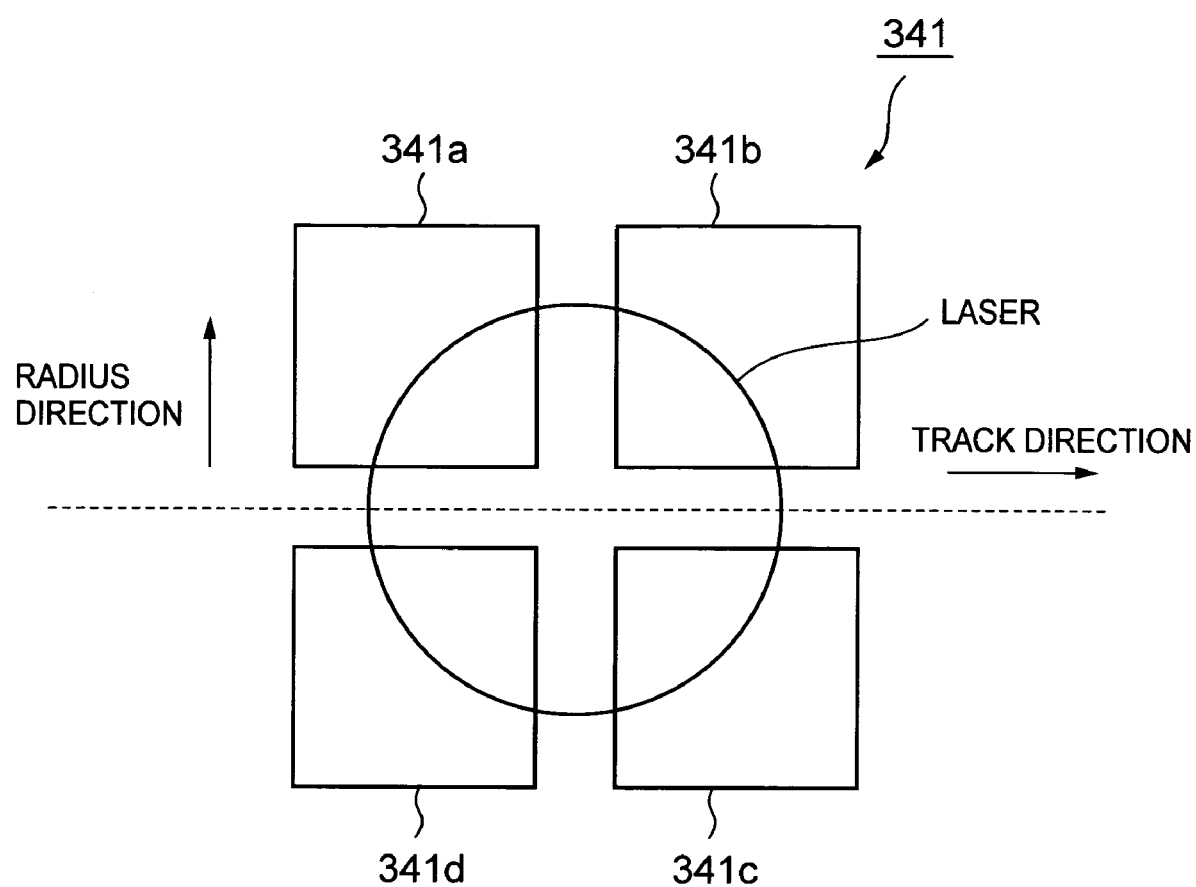
FIG. 7 is an enlarged cross section illustrating an example of a quadrant photo-detector.

As illustrated in FIG. 7, the quadrant photo-detector 341 consists of photo-detecting elements 341$a$, 341$b$, 341$c$ and 341$d$. A first set of photo-detecting elements having the photo-detecting elements 341$a$ and 341$b$ and a second set of photo-detecting elements having the photo-detecting elements 341$c$ and 341$d$ are arranged as facing each other over a track (in other words, in a radius direction). A beam spot emitted on the optical storage medium A is reflected therefrom and received by the photo-detecting elements 341$a$, 341$b$, 341$c$ and 341$d$. A differential-signal amplitude is defined by an expression (1) shown below in which Ia, Ib, Ic and Id are photo-detecting signals (current levels) output when the beam spot is detected by the photo-detecting elements 341$a$, 341$b$, 341$c$ and 341$d$. In the expression (1), AC indicates that the right side of the expression is alternating current.

$$\text{Amplitude in Differential Signal} = |(Ia+Ib)-(Ic+Id)|AC \quad (1)$$

In reproducing data from the optical storage medium A while being rotated, generally, the LD 33 emits a laser beam having a reproducing power Pr on tracks (grooves) formed spirally (or in straight) on the substrate 1 of the optical storage medium A so that a beam spot of the focused laser beam follows the tracks. This is referred to as an on-track state. When the beam spot is on the center of a groove or land in tracking, light intensities (Ia+Ib) and (Ic+Id) returned to the quadrant photo-detector 341 are equal to each other so that a differential signal (tracking detection signal) is 0, thus no amplitude being gained. In other words, the quadrant photo-detector produces a stable output.

Figure 8:
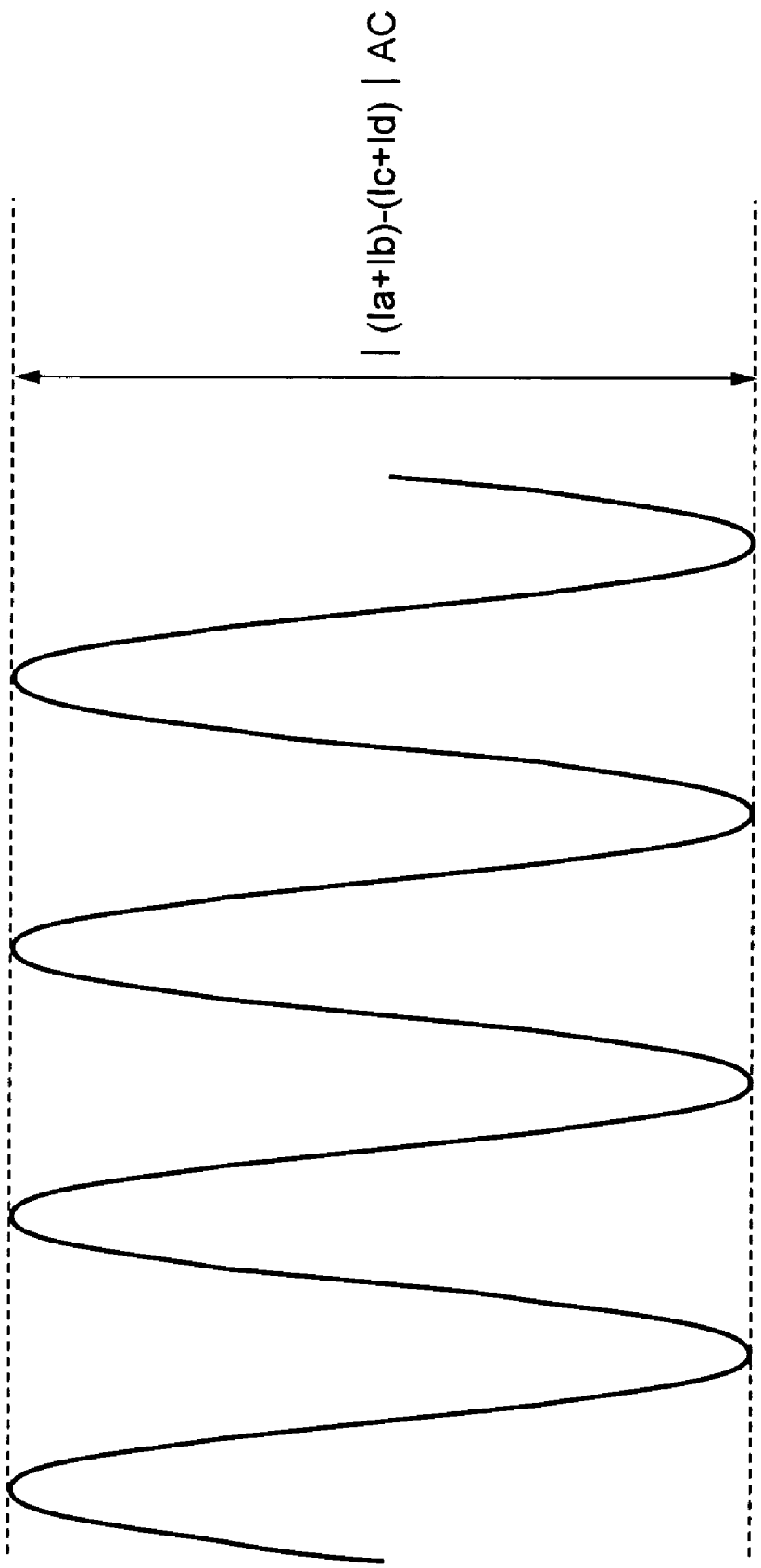
FIG. 8 is a view of differential-signal amplitude in an off-track state observed by an oscilloscope.

On the contrary, in a state (off-track state) in which the optical head 34 is fixed at a specific location so that a beam spot from the LD 33 does not follow tracks in reproduction of data while the optical storage medium is being rotated, there is a difference in light intensity returned to the quadrant photo-detector, thus, an amplitude output of a differential signal (tracking detection signal) exhibits periodical change, such as, shown in FIG. 8. FIG. 8 is a view of differential-signal amplitude in the off-track state observed by an oscilloscope. This change occurs due to periodical change in location of grooves formed on the optical storage medium A to a beam spot in accordance with rotation of the optical storage medium A.

Figure 9:
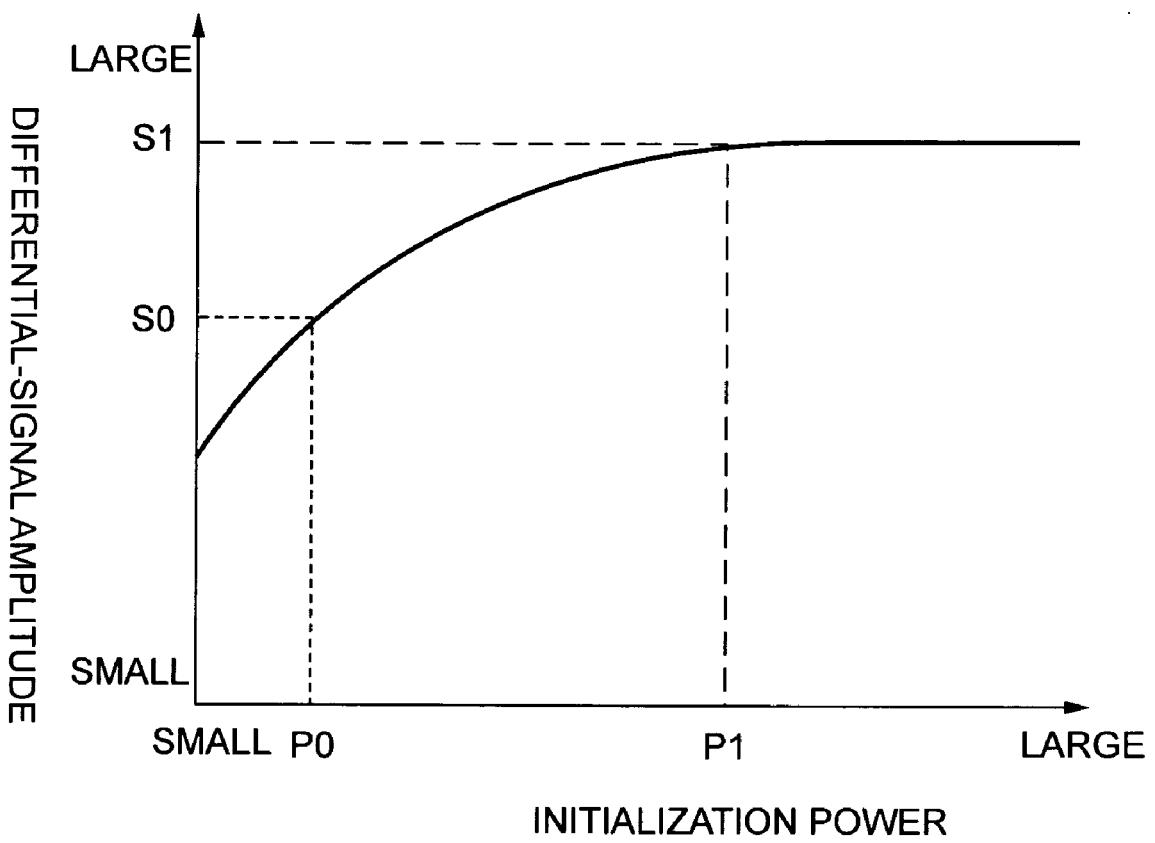
FIG. 9 is a view indicating a relationship of differential-signal amplitude in an off-track state to initialization power.

FIG. 9 is a view showing a differential-signal amplitude in the off-track state to a laser power (initialization power) of a D.C. (almost constant) laser that emits a laser beam to an optical storage medium in initialization. A gradual increase in initialization power to an optical storage medium gives the differential-signal amplitude a curve-like characteristics as shown. This curve has a saturation point S1 at and from which the differential-signal amplitude dose not increase even though the initialization power is raised. The characteristics, such as, shown in FIG. 9, is given when the crystalline structure of a material of the recording layer 3 (FIG. 2) is changed in accordance with the intensity (large or small) of initialization power. The crystalline structure of the recording layer 3 is also changed according to whether or not the differential-signal amplitude is located at the saturation point S1.

The differential-signal amplitude increases along the curve shown in FIG. 9 when a D.C. laser having a power larger than P0 is emitted to the recording layer 3 for which the optical storage medium A exhibits a differential-signal amplitude S0 which has been initialized by an initialization power P0 by which the differential-signal amplitude does not reach the saturation point S1. A possible reason for this increase is that the recording layer 3 becomes more crystallized when irradiated with the D.C. laser again.

Experiments and study by the inventors of the present invention found that optical storage media A initialized with the initialization power P0 by which the differential-signal amplitude does not reach the saturation point S1 and recorded under optimum requirements exhibit acceptable jitter characteristics after first-time (initial) recording (DOW 0: Direct Over Write, referred to as overwriting in the disclosure), and also after one-time overwriting (DOW 1) and repeated overwriting.

It was also found that optical storage media A initialized with the initialization power P1 or larger by which the differential-signal amplitude reaches the saturation point S1 do not exhibit excellent overwrite characteristics with acceptable DOW-0 jitter but very adverse DOW-1 jitter.

Overwriting is 1-beam overwriting for erasing a recorded mark already formed and forming a new recorded mark with one-time laser scanning, in the disclosure. Also defined in the disclosure are: DOW 0; initial recording for forming a recorded mark on an un-recorded section of an initialized optical storage medium A; and DOW 1; 1st overwriting for forming another recorded mark on the initially recorded section. Defined further in the disclosure are: "excellent" in jitter of 10% or less which is judged as giving less adverse effects to error rate; and "excellent DOW-jitter characteristics" for jitter of 10% or less over the range from DOW 0 to DOW 1000 (from initial recording to 1000-th overwriting).

Whether an optical storage medium A has been initialized with the initialization power P1 or larger by which the differential-signal amplitude reaches the saturation point S1 or the initialization power P0 by which the differential-signal amplitude does not reach the saturation point S1 can be determined in the way explained below even if the initialization power supplied to the optical storage medium A in initialization is not known. Measured first is a differential-signal amplitude in the off-track state for an initialized optical storage medium A. The optical storage medium A is then irradiated with a laser beam from a D.C. laser having an initialization power that is larger than a particular initialization power by which the measured initialization power is thought to be obtained. A differential-signal amplitude in the off-track state is measured again. The measured differential-signal amplitudes are compared with each other.

This embodiment has a feature in which a differential-signal amplitude in the off-track state after initialization is lower than the saturation point S1. A preferable example for achieving such a differential-signal amplitude is to adjust an initialization power of an initialization laser beam so that it is small enough not to reach the initialization power P1 that gives the saturation point S1.

Each of the following embodiment samples and comparative samples was subjected to recording (1-beam overwriting) and reproduction with an optical-disk drive tester (DDU1000) equipped with a 658 nm-wavelength laser diode and an optical lens (NA=0.60) made by Pulstec. Co.

Recording and reproduction were evaluated with an 8-16 (EFM+) modulation random pattern for a signal to be recoded at a recording linear velocity of 14 m/s (corresponding to 4× speed in DVD-RW standards). A unit clock T was 9.6 ns (DVD 4× speed), and a bit length was 0.267 µm/bit. Recording were conducted in the same density as DVD-ROM. The capacity of the optical storage medium A corresponded to 4.7 gigabytes. Recording of 10-time overwriting were conducted to a target track and adjacent tracks under optimum requirements for the optical storage medium A, followed by slicing at the amplitude center of each reproduced signal for measurements of clock to data jitters. The laser power Pr of each reproducing beam was constant at 0.7 mW.

A multiple pulse-sequence defined in the DVD-RW version 1.1, such as shown in FIG. 4, was used as the recording strategy.

Embodiment Sample 1

Several layers which will be disclosed later, were formed on a substrate 1 made of a polycarbonate resin with 120 mm in diameter and 0.6 mm in thickness. Grooves were formed on the substrate 1 at 0.74 µm in track pitch, with 25 nm in groove depth and about 40:60 in width ratio of groove to land. The grooves stuck out when viewed from an incident direction of a laser beam in recording, reproduction or erasure.

After a vacuum chamber was exhausted up to $3 \times 10^{-4}$ Pa, a 70 nm-thick first protective layer 2 was formed on the substrate 1 by high-frequency magnetron sputtering with a target of ZnS added with 20-mol % $SiO_2$ at $2 \times 10^{-1}$ Pa in Ar-gas atmosphere.

Formed on the first protective layer 2, in order, were a 16 nm-thick recording layer 3 with a target of an alloy of 4 elements Ge—In—Sb—Te, a 16 nm-thick second protective layer 4 of the same material as the first protective layer 2, and a 120 nm-thick reflective layer 5 with a target of Ag—Pd—Cu.

The substrate 1 was taken out from the vacuum chamber. The reflective layer 5 was spin-coated with an acrylic ultraviolet-cured resin (SK5110 made by Sony Chemicals. Co.). The resin was cured with radiation of ultraviolet rays so that a 3 μm-thick third protective layer 6 was formed on the reflective layer 5, thus an un-initialized optical storage medium A was produced.

The recording layer 3 of the un-initialized optical storage medium was initialized by POP120 made by Hitachi Computer Peripherals, Co. as the initialization apparatus 200 with a laser beam having 250 μm in beam width in radial direction and 1.0 μm in beam width in scanning direction, at 7.0 m/s in scanning linear velocity, and 200 μm in scanning pitch, thus the optical storage medium A shown in FIG. 2 was obtained. The saturation point S1 of a differential-signal amplitude of the optical storage medium A was initially measured with the initialization apparatus 200. The differential-signal amplitude of the optical storage medium A reached the saturation point S1 which was 5.2V when irradiated with an initialization power of 2400 mW.

Prepared as the embodiment sample 1 was an optical storage disk A initialized a laser power of 2000 mW. A measured differential-signal amplitude S0 was 5.04 V in the off-track state. Thus, an amplitude ratio S0/S1 is 0.97 in the embodiment sample 1. These values are shown in FIG. 18.

The values S0 and S1 vary which depend on optical storage media and measuring equipment. The amplitude ratio S0/S1 only limits the present invention. This is also applied to the other embodiment and comparative samples.

Recording was then conducted to the optical storage medium A from the incident plane 1a of the substrate 1 to the grooves of the recording layer 3.

The recording requirements for the recording pulse pattern were Ttop=0.6 [T], Tmp=0.5 [T], and Tcl=0.0 [T] at a linear velocity of 14 m/s (DVD×4 speed), with three levels in strength of laser beams: a recording power Pw=17.0 [mW], an erasing power Pe=5 [mW], and a bottom power Pb=0.5 [mW]. The optimum recording requirements were also applied to the following embodiment samples 2 and 3, and the comparative samples 1 and 2

Initial characteristics and overwrite recording characteristics were as shown in FIG. 18: 6.5% in initial-recording (DOW 0) jitter, 9.1% in 1-time overwrite (DOW 1) jitter, and 7.9% in 9-time overwrite (DOW 9) jitter. Moreover, jitter in 1000-time overwrite (DOW 1000) was 8.8%. Thus, the embodiment sample 1 was very stable in overwrite characteristics, with excellent recording characteristics.

Embodiment Sample 2

The optical storage medium A in the embodiment sample 2 was prepared as initialized at 1800 mW of laser power. A differential-signal amplitude S0 measured in the off-track state was 4.06 V. An amplitude ratio S0/S1 was then 0.78 for the embodiment sample 2. The other requirements were the same as for the embodiment sample 1.

Initial characteristics and overwrite recording characteristics were as shown in FIG. 18: 6.4% in DOW-0 jitter, 8.6% in DOW-1 jitter, and 7.8% in DOW-9 jitter. Moreover, jitter in DOW-1000 was 8.0%. Thus, the embodiment sample 2 was very stable in overwrite characteristics, with excellent recording characteristics.

Embodiment Sample 3

The optical storage medium A in the embodiment sample 3 was prepared as initialized at 1600 mW of laser power. A differential-signal amplitude S0 measured in the off-track state was 3.28 V. An amplitude ratio S0/S1 was then 0.63 for the embodiment sample 3. The other requirements were the same as for the embodiment sample 1.

Initial characteristics and overwrite recording characteristics were as shown in FIG. 18: 6.7% in DOW-0 jitter, 8.9% in DOW-1 jitter, and 7.8% in DOW-9 jitter. Moreover, jitter in DOW-1000 was 8.6%. Thus, the embodiment sample 3 was very stable in overwrite characteristics, with excellent recording characteristics.

Comparative Sample 1

The optical storage medium A in the comparative sample 1 was prepared as initialized at 2400 mW in laser power. The other requirements were the same as for the embodiment sample 1. A differential-signal amplitude S0 measured in the off-track state was 5.2 V. Thus, S0 and S1 were equal for the comparative sample 1. An amplitude ratio S0/S1 was 1.0.

Initial characteristics and overwrite recording characteristics were as shown in FIG. 18: 7.2% in DOW-0 jitter, 14.3% in DOW-1 jitter, and 10.8% in DOW-9 jitter. Moreover, jitter in DOW-1000 was 11.0%. The comparative sample 1 exhibited unacceptable jitter, particularly, in DOW 1, thus suffered from poor DOW-jitter characteristics.

It is thus understood that an initialization power that gives 1.0 to an amplitude ratio S0/S1, i.e., a saturation point S1 to a differential-signal amplitude in the off-track state, causes unacceptable DOW-1 jitter, thus resulting in adverse repeated-recording characteristics. In contrast, initialization with an initialization power that gives S0/S1 a level smaller than 1.0, i.e., a level that does not reach a saturation point S1, provides excellent DOW-jitter characteristics.

Comparative Sample 2

The optical storage medium A in the comparative sample 2 was identical to that of the embodiment sample 1 except change in initialization power to 1400 mW. The recording layer 3 of the comparative sample 2, however, remained in an amorphous phase. In other words, the comparative sample 2 was not changed into a crystalline phase, thus could not be initialized in the initialization step 200.

The comparative sample 2 and the embodiment sample 3 teach that an excellent DOW-jitter characteristics can be provided by lowering an initialization power to give a differential-signal amplitude in the off-track state lower than a saturation point S1 whereas initialization is failed by lowering an initialization power too much. A critical amplitude ratio S0/S1 is 0.6, a level lower than which causes difficulty in initialization of optical storage media.

It is found from the embodiment samples 1 to 3 and the comparative samples 1 and 2 that an amplitude ratio S0/S1 higher than 0.6 but lower than 1.0 provides excellent DOW-jitter characteristics and prevents adverse DOW-1 jitters. An amplitude ratio S0/S1 lower than 0.6 causes difficulty in initialization of optical storage media whereas 1.0 causes adverse DOW-1 jitters, and thus unacceptable repeated-recording characteristics.

A range for an amplitude ratio S0/S1 higher than 0.8 but lower than 1.0 is more preferable in achieving 18% or higher for reflectivity in DVD-RW standards.

The features of the present invention are particularly effective for optical storage media A to be used in recording at high linear velocity (DVD4× speed or higher).

Figure 10:
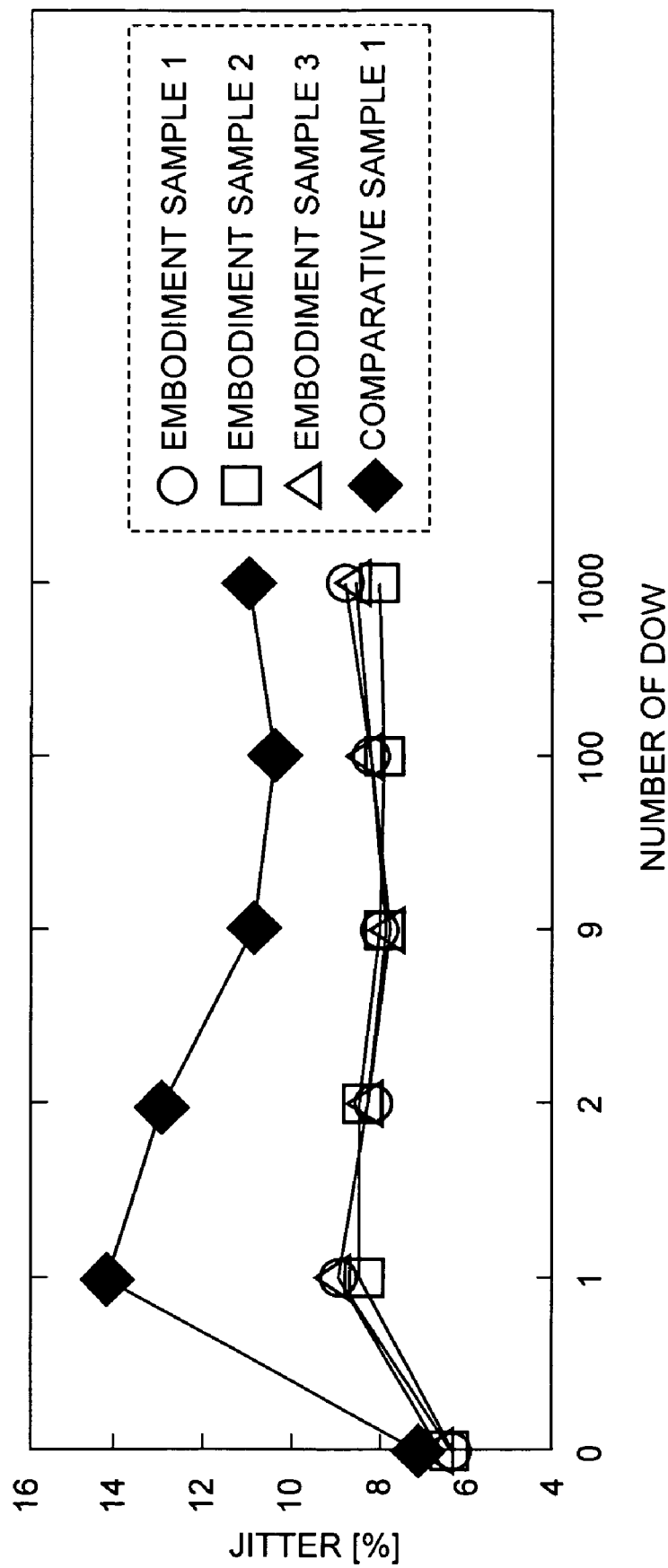
FIG. 10 is a view showing DOW-jitter characteristics indicating a relationship of jitter to the number of DOW.

These results are shown in FIG. 10 based on the values in FIG. 18. This figure also teaches that acceptable DOW-1 jitter levels are obtained by initialization of optical storage media at an initialization power that does not give a saturation point S1.

[Study of Optimum Erasing Power]

The inventors of the present invention presupposed that an erasing power Pe could affect recording and overwrite characteristics of optical storage media, and found out that the presumption is correct and there is an optimum erasing power that gives excellent recording and overwrite characteristics, based on the following embodiment samples 4 to 8 and comparative samples 3 to 7.

Embodiment Sample 4

Figure 11:
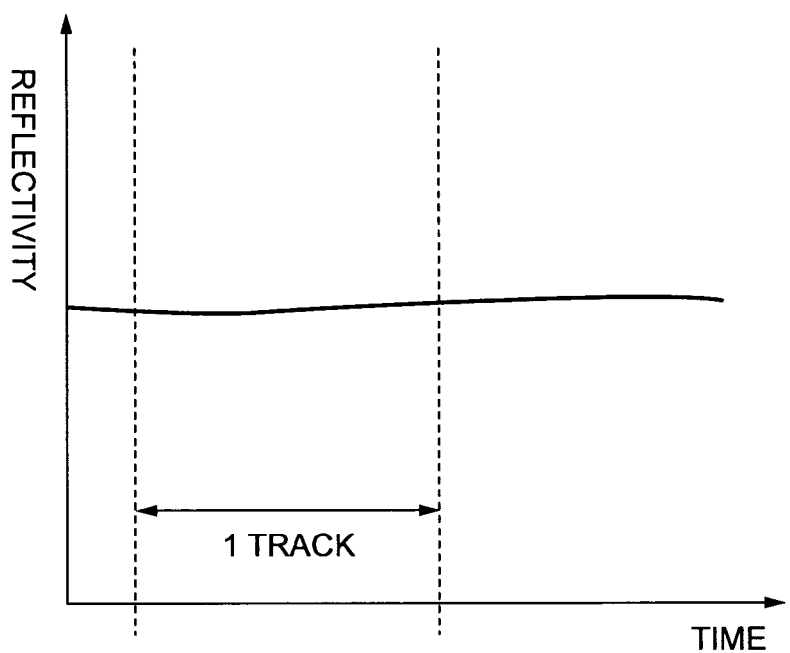
FIG. 11 is a view indicating an acceptable example of change in reflectivity in an optical storage medium A.

The optical storage medium A in the embodiment sample 4 was prepared as initialized at 4.5 m/s in scanning linear velocity, 1600 mW in laser power, and 220 µm in scanning pitch. The other requirements are the same as for the embodiment sample 1. The optical storage medium A initialized under these initialization requirements exhibited a small reflectivity change in a track, i.e., almost constant reflectivity, as shown in FIG. 11.

Figure 12:
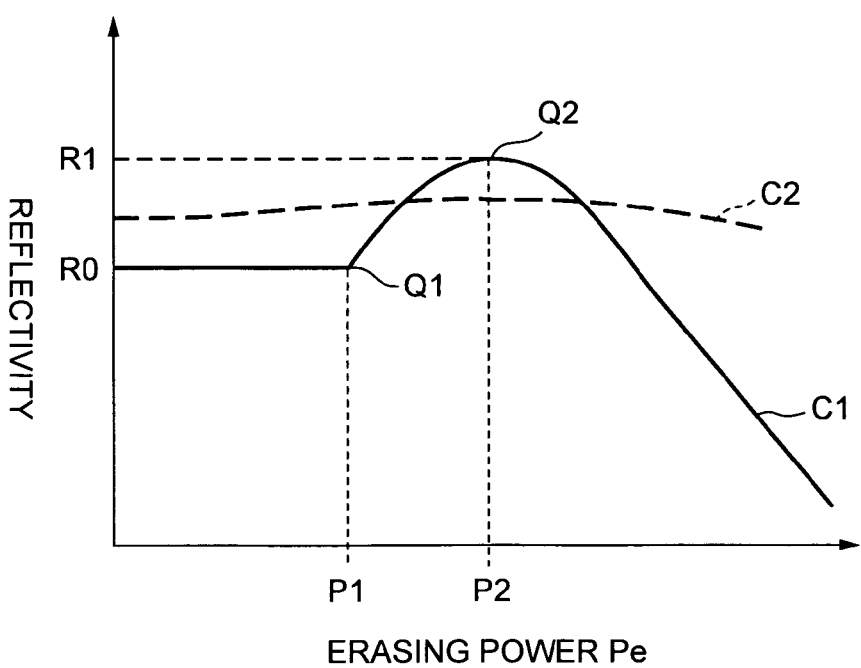
FIG. 12 is a view illustrating a reflectivity curve.

Obtained next was a reflectivity R0 exhibited by an unrecorded section of the recording area 54 of the optical storage medium A (FIG. 3), on which no data has ever been recorded, when irradiated with a reproducing beam having a reproduction power Pr (0.7 mW) from the LD 33. A reflectivity curve C1 as depicted by a solid line in FIG. 12 can be given based on the measurements of a reflectivity R exhibited by the un-recorded section at each erasing power Pe when irradiated with a reproduction laser beam and while irradiated with a laser beam having the erasing power Pe that is being varied.

The reflectivity curve C1 can be approximated by a linear curve having a gradient of almost 0 at the erasing power Pe from 0 mW as a staring point to an inflection point Q1. The erasing power is P1 at the inflection point Q1. The reflectivity from the staring point (power 0) to the inflection point Q1 is equal to the reflectivity R0 exhibited by the un-recorded section. The reflectivity gradually increases as the erasing power increases when the reflectivity curve C1 passes the inflection point Q1 and the erasing power goes beyond P1, and reaches a peak point Q2. The erasing power is P2 at the peak point Q2, which gives the maximum reflectivity R1. Once reaching the peak point Q2, the reflectivity decreases no matter how an erasing power larger than the erasing power P2 is emitted.

The optical storage medium A in the embodiment sample 4 exhibited 19.5 in reflectivity R0 on the un-recorded section, with 6.5 mW in erasing power P1 at the inflection point Q1, and 21.1 in the maximum reflectivity R1. Thus, the a reflectivity ratio ((R1−R0)/R0) was 0.08.

Recording was then conducted to the optical storage medium A from the incident plane 1a of the substrate 1 to the grooves of the recording layer 3.

The recording pulse pattern as the optimum recording requirements for the optical storage medium A in the embodiment sample 4 included: Ttop=0.6 [T], Tmp=0.5 [T], and Tcl=0.0 [T] at a linear velocity of 14 m/s (DVD 4× speed). The employed strength in laser beam included three levels: a recording power Pw=17.0 [mW], an erasing power Pe=4.6 [mW], and a bottom power Pb=0.5 [mW]. An erasing power ratio (Pe/P1) was 0.7. The measured values are shown in FIG. 19.

Initial characteristics and overwrite recording characteristics were as shown in FIG. 19: 6.5% in initial-recording (DOW 0) jitter, 8.40/in 1-time overwrite (DOW 1) jitter, and 8.10/in 9-time overwrite (DOW 9) jitter. Moreover, jitter in about 1000-time overwrite (DOW 1000) was 8.80%. Thus, the embodiment sample 4 was very stable in overwriting, with excellent recording characteristics.

Embodiment Sample 5

The optical storage medium A in the embodiment sample 5 was identical to that in the embodiment sample 4 except change in thickness of the second protective layer 2 to 12 nm. R0, an erasing power P1 at the inflection point Q1, R1, and a reflectivity ratio were 21.0, 7.5 mW, 21.7, and 0.03, respectively.

Recording was conducted and evaluated with the same recording requirements as for the embodiment sample 4 except change in recording power Pw and erasing power Pe to 17.5 mW and 6.0 mW, respectively, with an erasing power ratio of 0.8.

Initial characteristics and overwrite recording characteristics were as shown in FIG. 19: 6.8% in DOW-0 jitter, 8.8% in DOW-1 jitter, and 7.8% in DOW-9 jitter. Moreover, DOW-1000 jitter was 8.0%. Thus, the embodiment sample 5 was always stable in characteristics after overwriting, with excellent recording characteristics.

Embodiment Sample 6

The optical storage medium A in the embodiment sample 6 was identical to that in the embodiment sample 4 except change in thickness of the recording layer 3 to 12 nm. R0, an erasing power P1 at the inflection point Q1, R1, and a reflectivity ratio were 16.0, 6.0 mW, 18.4, and 0.15, respectively.

Recording was conducted and evaluated with the same recording requirements as for the embodiment sample 4 except change in recording power Pw and erasing power Pe to 16.0 mW and 4.2 mW, respectively, with an erasing power ratio of 0.7.

Initial characteristics and overwrite recording characteristics were excellent, as shown in FIG. 19, like the embodiment sample 4.

Embodiment Sample 7

The optical storage medium A in the embodiment sample 7 was identical to that in the embodiment sample 4. Recording was conducted and evaluated with the same recording requirements as for the embodiment sample 4 except change in erasing power Pe to 3.0 mW. An erasing power P1 at the inflection point Q1 was 6.5 mW, the same as for the embodiment sample 4, with an erasing power ratio of 0.5.

Excellent characteristics were obtained, like the embodiment sample 4, although DOW-1 jitter was 9.2%, a little bit high, as shown in FIG. 19.

Embodiment Sample 8

The optical storage medium A in the embodiment sample 8 was identical to that in the embodiment sample 4. Recording was conducted and evaluated with the same recording requirements as for the embodiment sample 4 except change in erasing power Pe to 6.5 mW. An erasing power P1 at the inflection point Q1 was 6.5 mW, the same as for the embodiment sample 4, with an erasing power ratio of 1.0.

Excellent characteristics were obtained, like the embodiment sample 4, although DOW-1000 jitter was 9.4%, a little bit high, as shown in FIG. 19.

Comparative Sample 3

The optical storage medium A in the comparative sample 3 was identical to that in the embodiment sample 4 except change in Sb/Te ratio to higher for a target of an alloy of 4 elements Ge—In—Sb—Te used in the recording layer 3. A reflectivity curve for the optical storage medium A in the comparative sample 3 was given with a small change in reflectivity having no inflection point Q1 and peak point Q2, such as, a reflectivity curve C2 depicted by a dashed line in FIG. 12. No erasing power P1 was thus given at an inflection point Q1. Calculation in the same way as above gave 0.02 in reflection ratio based on 21.6 as a reflectivity R0 on an un-recorded section and 22.0, the maximum level in the reflectivity curve C2, as the maximum reflectivity R1.

Recording was conducted and evaluated with the same recording requirements as for the embodiment sample 4.

Initial characteristics and overwrite recording characteristics were, as shown in FIG. 19, acceptable in DOW-0 and -9 jitters whereas adverse in DOW-1 jitter, thus the comparative sample 3 suffered from poor DOW-jitter characteristics.

Comparative Sample 4

The optical storage medium A in the comparative sample 4 was identical to that in the embodiment sample 4 except change in Sb/Te ratio to lower for a target of an alloy of 4 elements Ge—In—Sb—Te used in the recording layer 3. The reflectivity curve C2 was given in the same way as the comparative sample 3. No erasing power P1 was given at an inflection point Q1. Calculation in the same way as above gave 0.02 in reflection ratio based on 19.1 as a reflectivity R0 on an un-recorded section and 19.4, the maximum level in the reflectivity curve C2, as the maximum reflectivity R1.

Recording was conducted and evaluated with the same recording requirements as for the embodiment sample 4 except change in recording power Pw and erasing power Pe to 15.0 mW and 4.2 mW, respectively.

Initial characteristics and overwrite recording characteristics were, as shown in FIG. 19, acceptable in DOW-0 jitter whereas adverse in DOW-1, -9 and -1000 jitters, thus the comparative sample 4 suffered from poor DOW-jitter characteristics.

Comparative Sample 5

Figure 13:
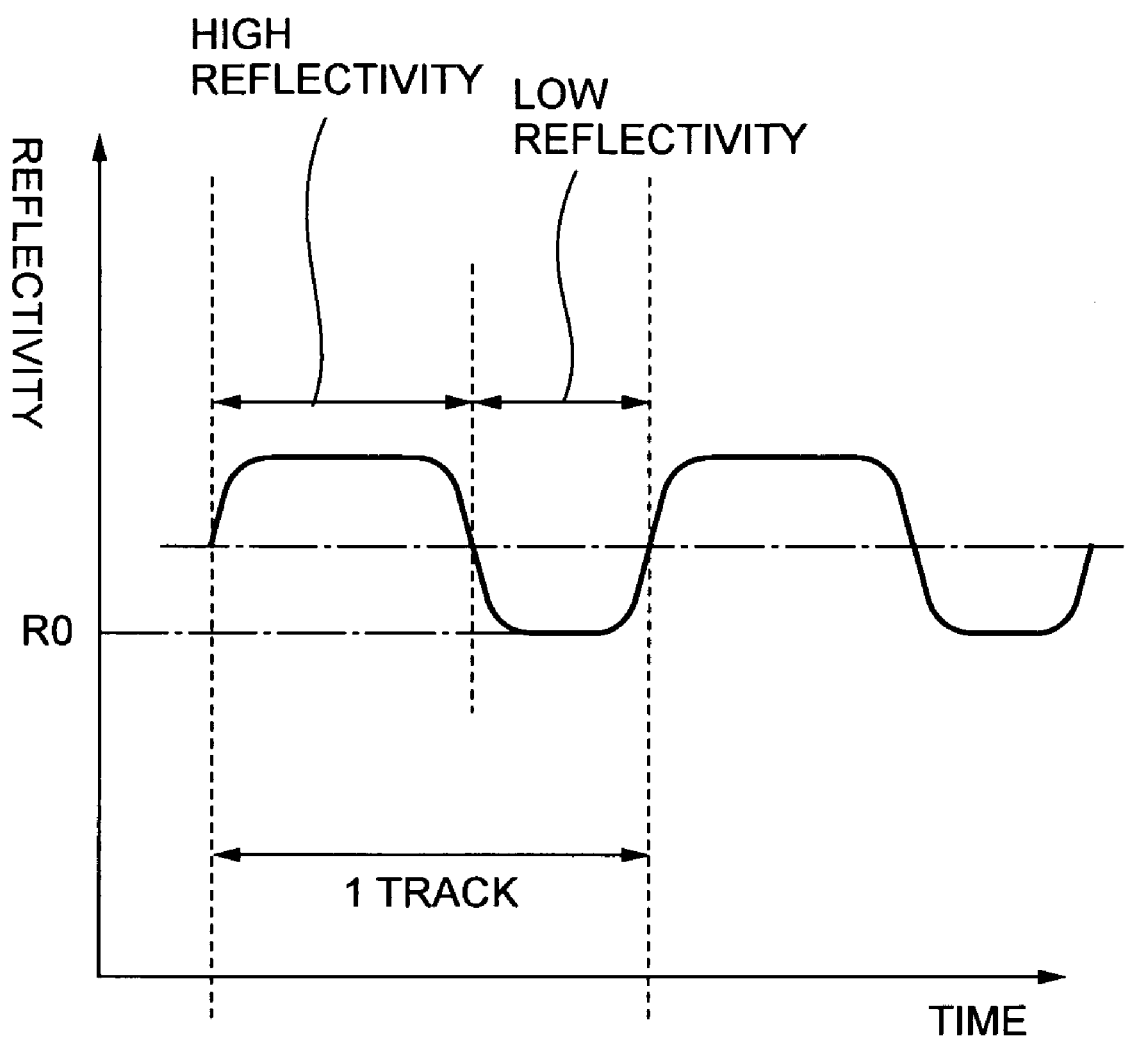
FIG. 13 is a view indicating an unacceptable example of change in reflectivity in the optical storage medium A.

The optical storage medium A in the comparative sample 5 was prepared as initialized at 2200 mW of laser power. The optical storage medium A initialized with this initialization requirement exhibited a large reflectivity change in a track, as shown in FIG. 13. R0, an erasing power P1 at the inflection point Q1, R1, and a reflectivity ratio were 17.5, 5.0 mW, 21.0, and 0.20, respectively.

Recording was conducted and evaluated with the same recording requirements as for the embodiment sample 4 revealed poor DOW-jitter characteristics with adverse jitters in DOW 1 and DOW 1000, as shown in FIG. 19. An erasing power ratio was 0.9.

Comparative Sample 6

The optical storage medium A in the comparative sample 6 was identical to that in the embodiment sample 4. Recording was conducted and evaluated with the same recording requirements as for the embodiment sample 4 except change in erasing power Pe to 2.5 mW. An erasing power P1 at the inflection point Q1 was 6.5 mW, the same as the embodiment sample 4. An erasing power ratio was 0.4.

As shown in FIG. 19, the comparative sample 6 suffered from poor DOW-jitter characteristics with 10% or higher jitters beginning from DOW-0 jitter.

Comparative Sample 7

The optical storage medium A in the comparative sample 7 was identical to that in the embodiment sample 4. Recording was conducted and evaluated with the same recording requirements as for the embodiment sample 4 except change in erasing power Pe to 7.5 mW. An erasing power P1 at the inflection point Q1 was 6.5 mW, the same as the embodiment sample 4. An erasing power ratio was 1.2.

As shown in FIG. 19, the comparative sample 7 suffered from poor DOW-jitter characteristics with a level higher than 10% in DOW-1000 even though acceptable levels in DOW-0 and -9 jitters.

According the evaluation, it is found that optical storage media exhibit excellent DOW-jitter characteristics when a reflectivity ratio $((R1-R0)/R0)$ satisfies the following expression (2).

$$0.03 \leq (R1-R0)/R0 \leq 0.15 \quad (2)$$

Figure 14:
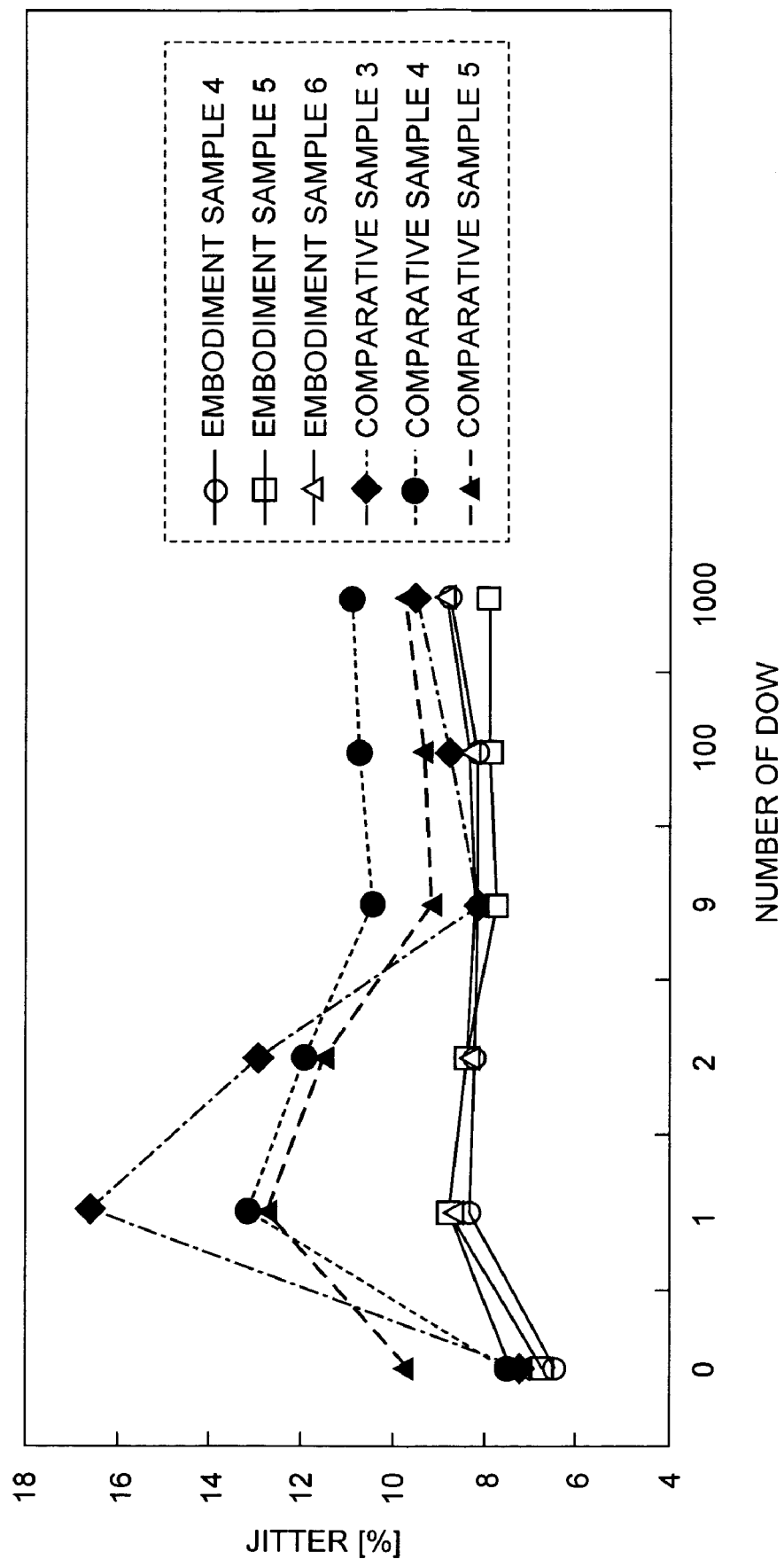
FIG. 14 is a view showing DOW-jitter characteristics in embodiment samples 4 to 6 and comparative samples 3 to 5.

FIG. 14 shows DOW-jitter characteristics in the embodiment samples 4 to 6 and the comparative samples 3 to 5. When a reflectivity ratio is lower than 0.03, i.e., a reflectivity does not increase irrespective of increase in erasing power, DOW-1 jitter goes beyond 10%, resulting in poor recording characteristics. In contrast, when a reflectivity ratio is higher than 0.15, since the optical storage media have been initialized under requirements with a mixture of high-reflectivity sections and low-reflectivity sections in a track, recording and overwrite characteristics are unacceptable beginning from DOW 0.

Figure 15:
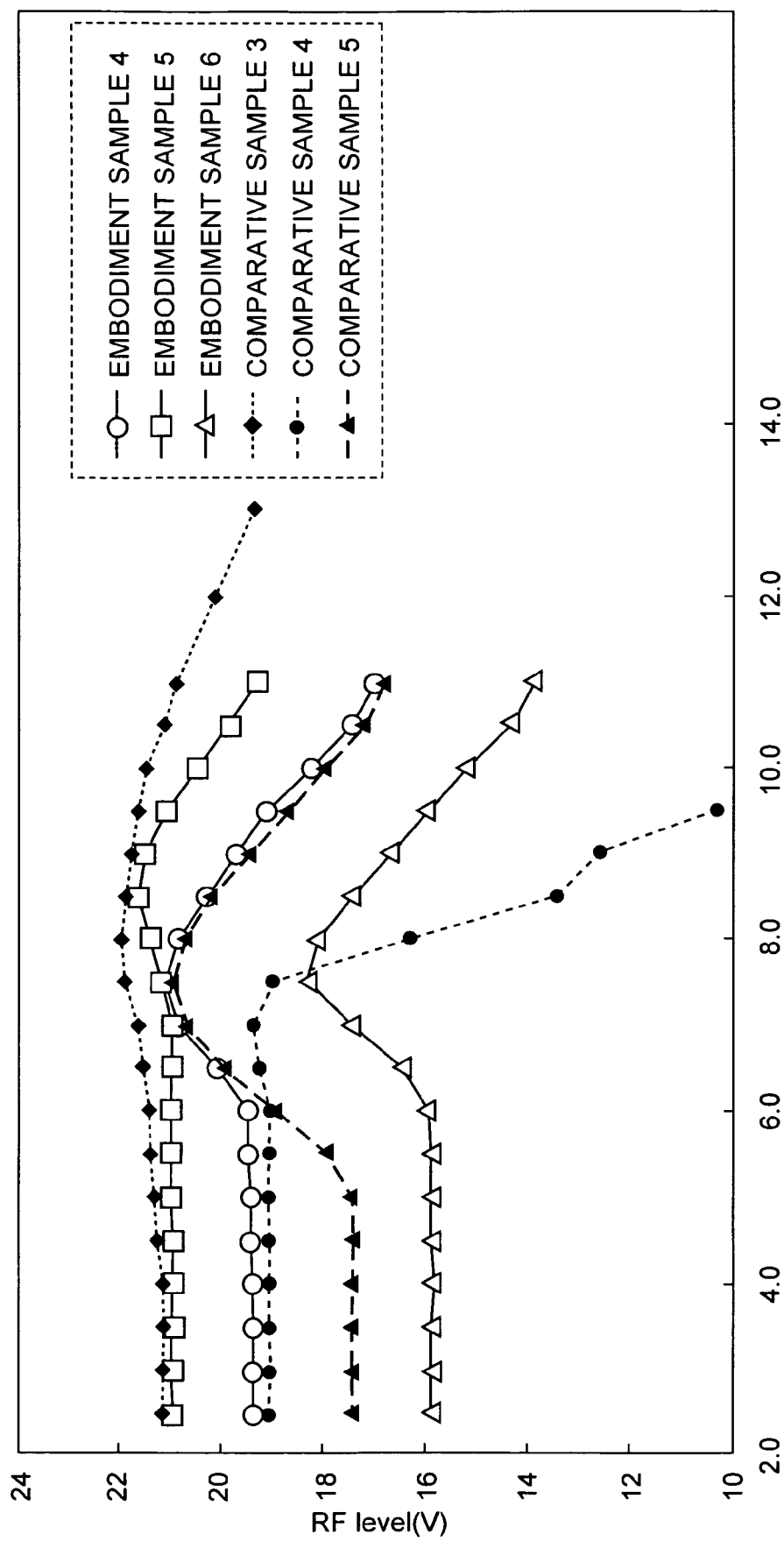
FIG. 15 is a view indicating a relationship of RF signal to erasing power Pe in the embodiment samples 4 to 6 and the comparative samples 3 to 5.

FIG. 15 indicates a relationship of RF signal to erasing power Pe in the embodiment samples 4 to 6 and the comparative samples 3 to 5.

As understood from FIG. 19, it is found that it is preferable that an erasing power ratio (Pe/P1) satisfies the following expression (3).

$$0.5 \leq Pe/P \leq 1.0 \quad (3)$$

Figure 16:
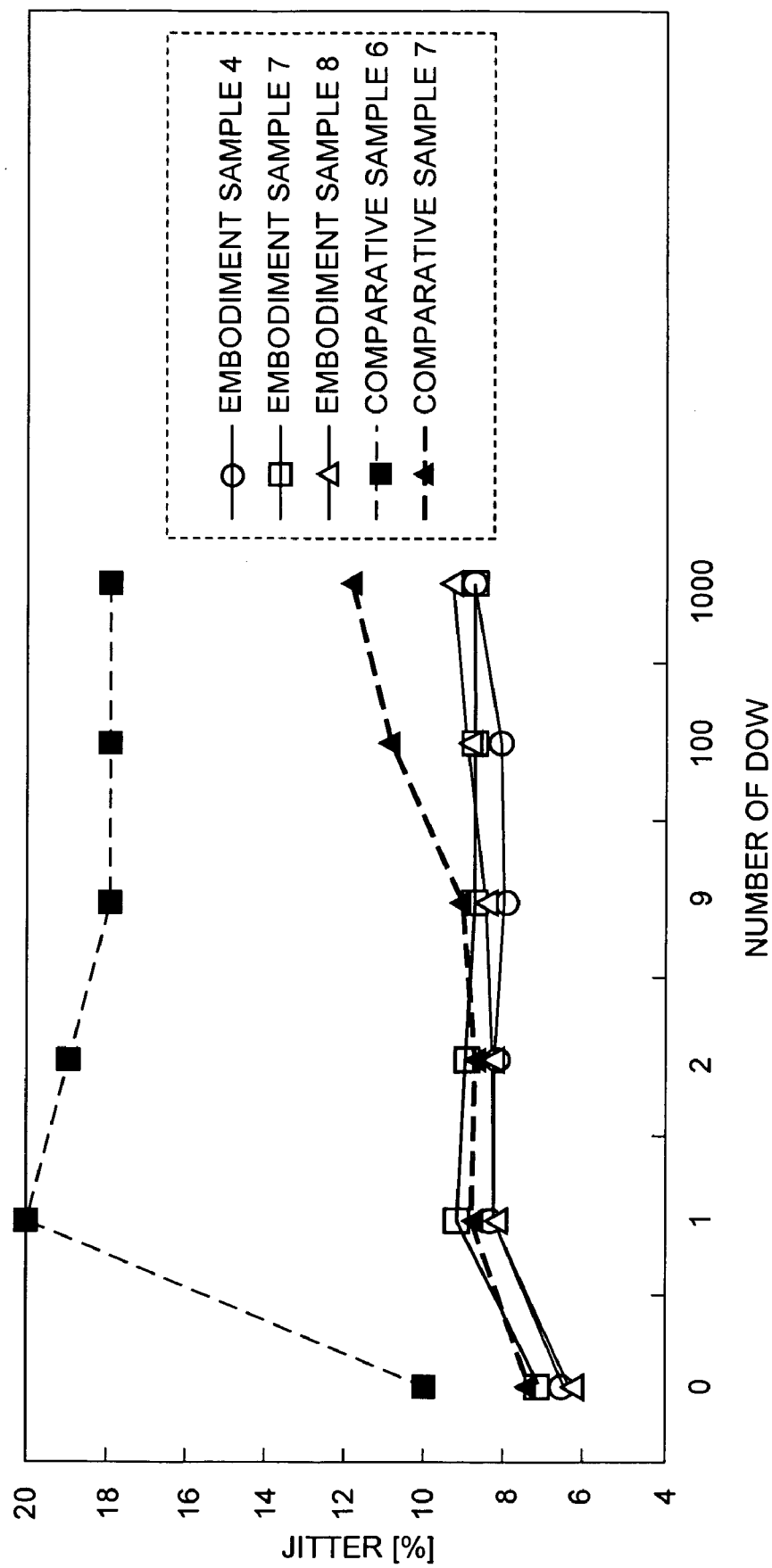
FIG. 16 is a view showing DOW-jitter characteristics in embodiment samples 4, 7 and 8, and comparative samples 6 and 7.

FIG. 16 shows DOW-jitter characteristics in the embodiment samples 4, 7 and 8, and the comparative samples 6 and 7. An erasing power ratio lower than 0.5 gives a smaller erasing power Pe that cannot completely erase recorded marks, thus resulting in poor recording and overwrite characteristics. In contrast, an erasing power ratio higher than 1.0 causes jitters of 10% or higher beginning from DOW 9, thus resulting in poor recording characteristics.

Moreover, it is found that initialization requirements for the optical storage media A also affect recording and overwrite characteristics. As shown in FIG. 13, the optical storage media A initialized with the initialization requirements that caused a large reflectivity change in a track, suffered from poor recording and overwrite characteristics. It is thus preferable to initialize the optical storage media A with optimum initialization requirements that cause almost no reflectivity change in a track.

Figure 17:
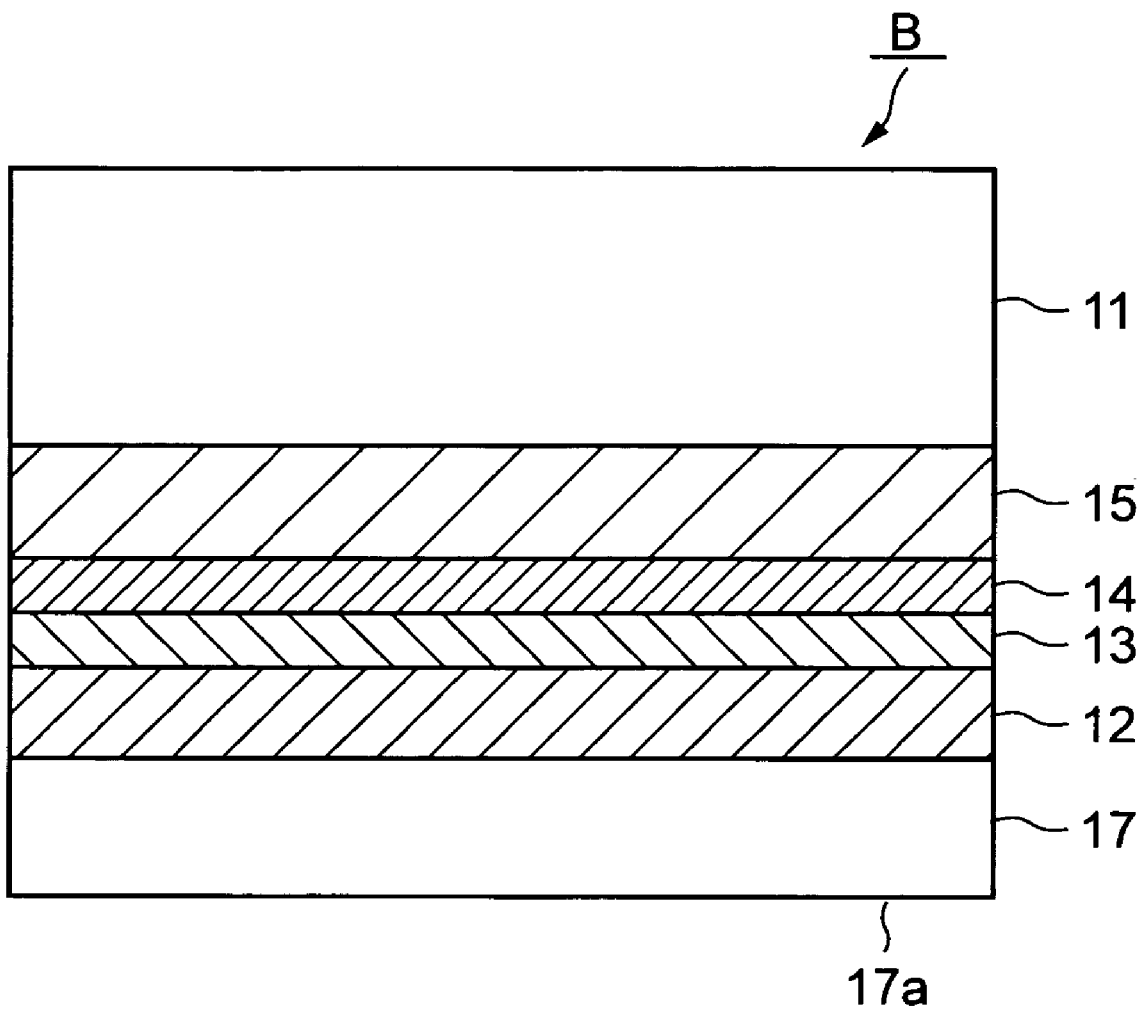
FIG. 17 is an enlarged cross section illustrating another embodiment of an optical storage medium according to the present invention.

The same advantages are given not only to phase-change optical storage media, such as, DVD-RW but also to a high-density phase-change optical storage medium, such as, shown in FIG. 17. A optical storage medium B shown in FIG. 17 has a structure in which a first protective layer 12, a recording layer 13, a second protective layer 14, a reflective layer 15, and a substrate 11 are laminated in order on a protective layer 17 having a bottom surface that is an incident plane 17a on which a recording or reproducing laser beam, or an erasing laser beam is incident.

As disclosed above in detail, the present invention is achieved to solve the problems discussed above and provides an optical storage medium, an optical recording method and an optical recording apparatus that offer excellent recording characteristics even at higher recording speed (in higher linear-velocity recording at and over, for example, DVD 4× speed (linear-velocity: 14 m/s)) and maintain excellent overwrite characteristics in one-time or plural times of overwriting.

According to the present invention, excellent recording characteristics are achieved at higher recording speed and maintained in one-time or plural times of overwriting.

What is claimed is:

1. A phase-change optical storage medium comprising:
a substrate; and
a recording layer having a plurality of tracks for storing information,
wherein a material of which the recording layer is made has been initialized in a crystalline state in which an amplitude of a tracking-detection signal is smaller than a saturation value of the amplitude, the tracking-detection signal being obtained by receiving a reflected beam from the recording layer when the recording layer is irradiated with a laser beam in an off-track state while the optical storage medium is being rotated, the amplitude being obtained by an expression (la+lb)−(lc+ld) in which (la+lb) are outputs of a first pair of photo-detecting elements and (lc+ld) are outputs of a second pair of photo-detecting elements, the first and second pairs of photo-detecting elements being arranged as facing each other with respect to each track to constitute a quadrant photo-detector.

2. The phase-change optical storage medium according to claim 1, wherein a value obtained by dividing the amplitude by the saturation value is larger than 0.6 but smaller than 1.0.

* * * * *